United States Patent [19]

Klesenski

[11] Patent Number: 5,579,768
[45] Date of Patent: Dec. 3, 1996

[54] AUTOMATIC GAIN COMPENSATION IN AN ULTRASOUND IMAGING SYSTEM

[75] Inventor: Kevin L. Klesenski, Los Altos, Calif.

[73] Assignee: Acuson Corporation, Mountain View, Calif.

[21] Appl. No.: 408,004

[22] Filed: Mar. 21, 1995

[51] Int. Cl.$^6$ ..................................................... A61B 8/00
[52] U.S. Cl. ...................................... 128/660.06; 73/631
[58] Field of Search ..................... 128/660.01, 660.06, 128/660.07, 661.01; 73/631

[56] References Cited

U.S. PATENT DOCUMENTS

| | | | |
|---|---|---|---|
| 3,690,153 | 9/1972 | Matay | 73/67.8 R |
| 4,043,181 | 8/1977 | Nigam | 73/67.8 R |
| 4,176,658 | 12/1979 | Kossoff et al. | 128/660 |
| 4,356,731 | 11/1982 | Mahony | 73/631 |
| 4,389,893 | 6/1983 | Ophir et al. | 73/599 |
| 4,408,492 | 10/1983 | Kossoff et al. | 73/631 |
| 4,441,368 | 4/1984 | Flax | 73/599 |
| 4,452,085 | 6/1984 | Pelc et al. | 73/631 |
| 4,470,303 | 9/1984 | O'Donnell | 73/602 |
| 4,475,400 | 10/1984 | Flax | 73/631 |
| 4,513,621 | 4/1985 | Renzel et al. | 73/631 |
| 4,569,353 | 2/1986 | Ferrari | 128/660 |
| 4,662,380 | 5/1987 | Riley | 128/660 |
| 4,745,398 | 5/1988 | Tjomehoj et al. | 73/599 |
| 4,751,846 | 6/1988 | Dousse | 73/602 |
| 4,785,818 | 11/1988 | Hardin | 128/660.07 |

(List continued on next page.)

FOREIGN PATENT DOCUMENTS

| | | |
|---|---|---|
| 1329733 | 5/1963 | France . |
| 1534366 | 7/1976 | United Kingdom . |

OTHER PUBLICATIONS

Claesson et al., "Frequency- and Depth-Dependent Compensation of Ultrasonic Signals," *IEEE Trans. on Ultrasonics, Ferro, and Freq. Control*, Sep. 1988. DeClercq et al., Adaptive Gain Control for Dynamic Ultrasound Imaging, 1975.
*Ultrasonics Symposium Proceedings*, pp. 59–63. Janssen et al., "Adaptive Interpolation of Discrete–Time Signals That Can Be Modeled as Autoregressive Processes," *IEEE Trans. on Acoustics, Speecch and Signal Processing*, Apr. 1986, pp. 317–330.
Kristoffersen et al., "A Time–Shared Ultrasound Doppler Measurement and 2–D Imaging System," *IEEE Trans. on Biomedical Engineering*, May 1988, pp. 285–295.
Kuc, "Ultrasonic Tissue Characterization Using Kurtosis," *IEEE Trans. on Ultrasonics, Ferro, and Freq. Conrol*, May 1986.
Ophir et al., "Digital Scan Converters in Diagnostic Ultrasound Imaging," *Proc. of the IEEE*, Apr. 1979, pp. 654–663.

*Primary Examiner*—Francis Jaworski
*Attorney, Agent, or Firm*—Majestic, Parsons, Siebert & Hsue

[57] ABSTRACT

The invention includes a method and system for automatic gain compensation in an ultrasound imaging system. The method and system may be used in place of, or in addition to, gain compensation selected by an operator. Gain compensation may be in response to range, in response to cross-range, or in response to both. Ultrasound imaging data is partitioned into relatively small zones (such as regions selected in response to range and cross-range), and a zone intensity value representative of each zone is used to determine information, such as an average image intensity, about ultrasound signals reflected from objects being imaged in each zone. The zone intensity value can be determined during real-time image acquisition by special-purpose averaging hardware, so that a commercial programmable microprocessor may operate on the zone intensity values to generate a gain compensation curve, also in real-time. Only those zones whose intensity is determined to be from tissue reflection are used to determine gain variations with range. A set of row mean values and a set of attenuation estimates for each row of zones having like range is determined, allowing for lateral gain rolloff at image edges, and from which a global gain to be applied, and a gain curve to be applied, are determined.

84 Claims, 6 Drawing Sheets

U.S. PATENT DOCUMENTS

| | | | |
|---|---|---|---|
| 4,786,818 | 11/1988 | Mead et al. | 250/578 |
| 4,817,617 | 4/1989 | Takeuchi et al. | 128/660.05 |
| 4,852,576 | 8/1989 | Inbar et al. | 128/660.06 |
| 4,887,306 | 12/1989 | Hwang et al. | 382/54 |
| 5,107,841 | 4/1992 | Sturgill | 128/661.09 |
| 5,113,706 | 5/1992 | Pittaro | 73/626 |
| 5,226,420 | 7/1993 | Peterson | 128/661.09 |
| 5,249,548 | 10/1993 | Dupuy | 119/243 |
| 5,257,624 | 11/1993 | Fraser et al. | 128/660.01 |
| 5,271,404 | 12/1993 | Corl et al. | 128/661.08 |
| 5,287,753 | 2/1994 | Routh et al. | 73/861.25 |
| 5,301,168 | 4/1994 | Miller | 367/138 |
| 5,301,674 | 4/1994 | Erikson et al. | 128/661.01 |
| 5,313,948 | 5/1994 | Murashita et al. | 128/662.02 |
| 5,501,221 | 3/1996 | Foster et al. | 128/660.06 |

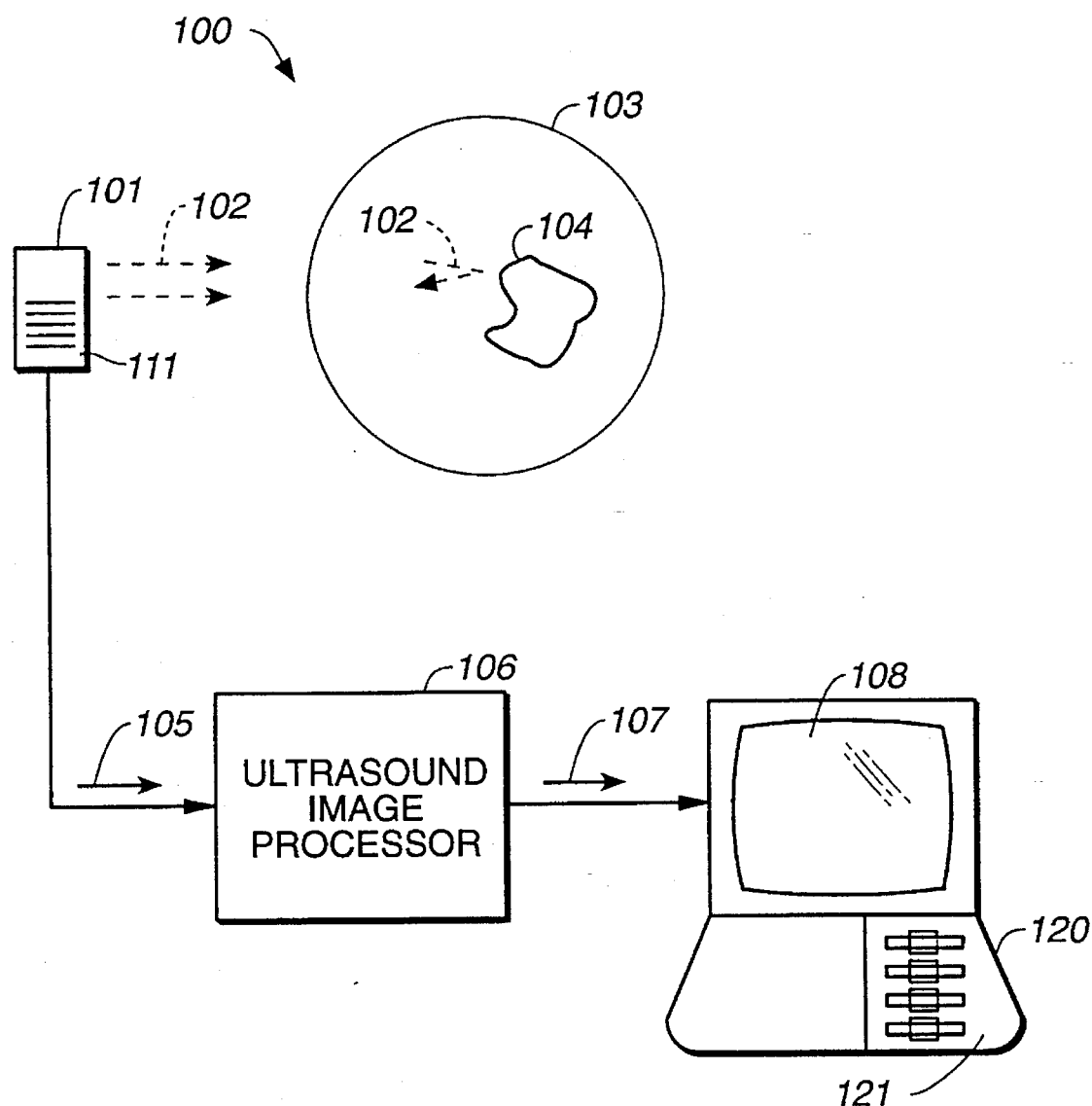
FIG._1

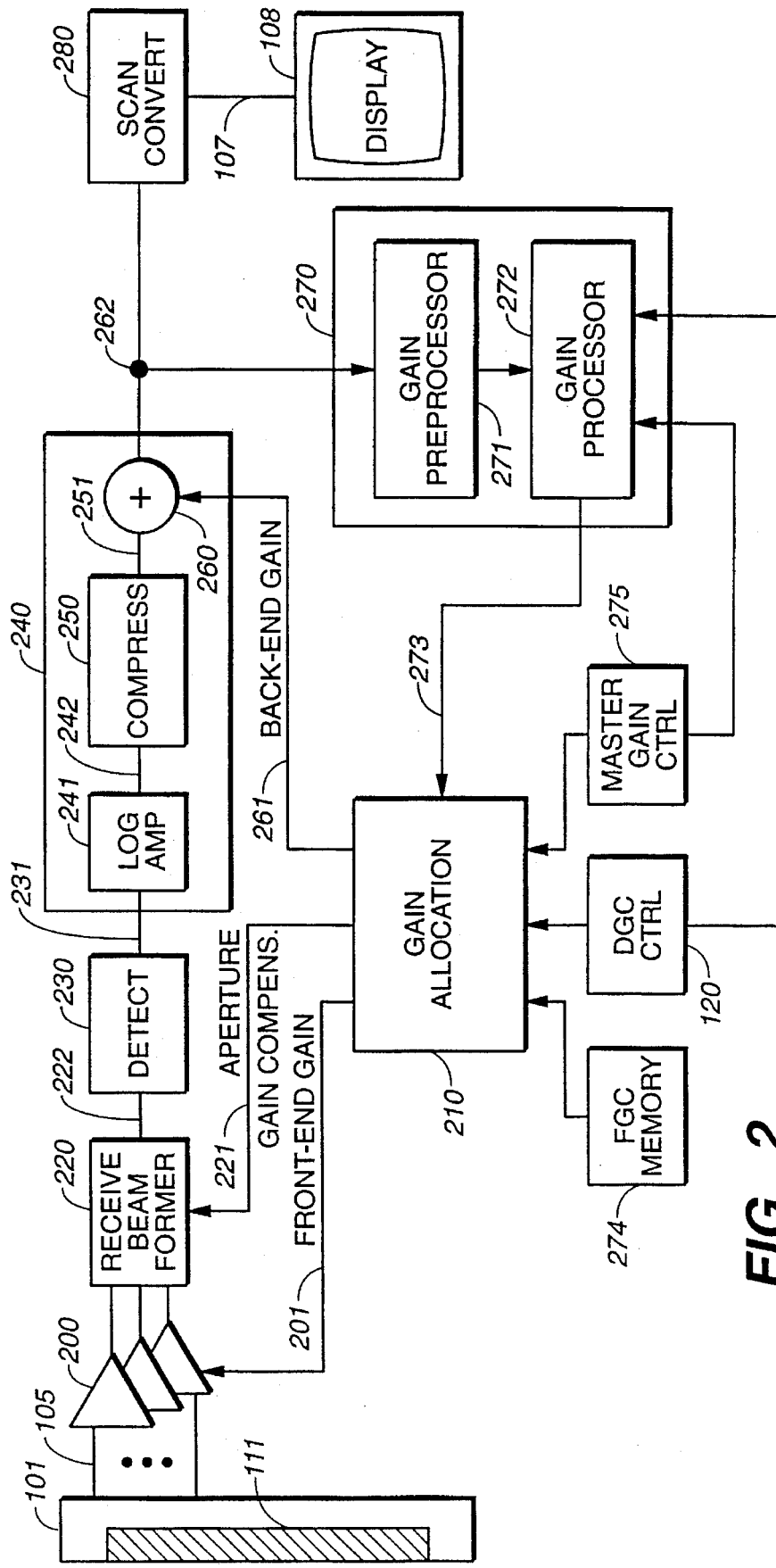
FIG._2

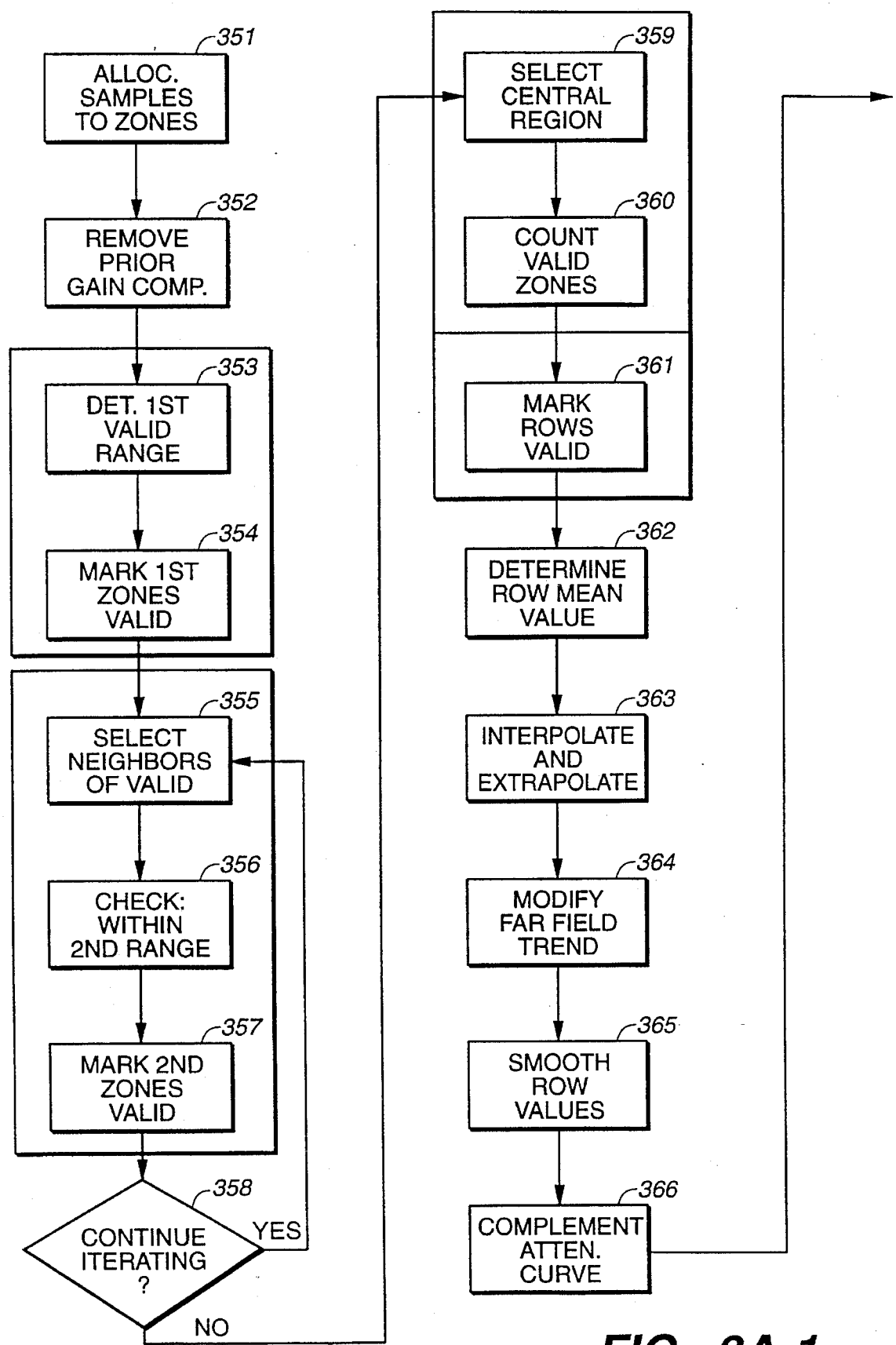
FIG._3A-1

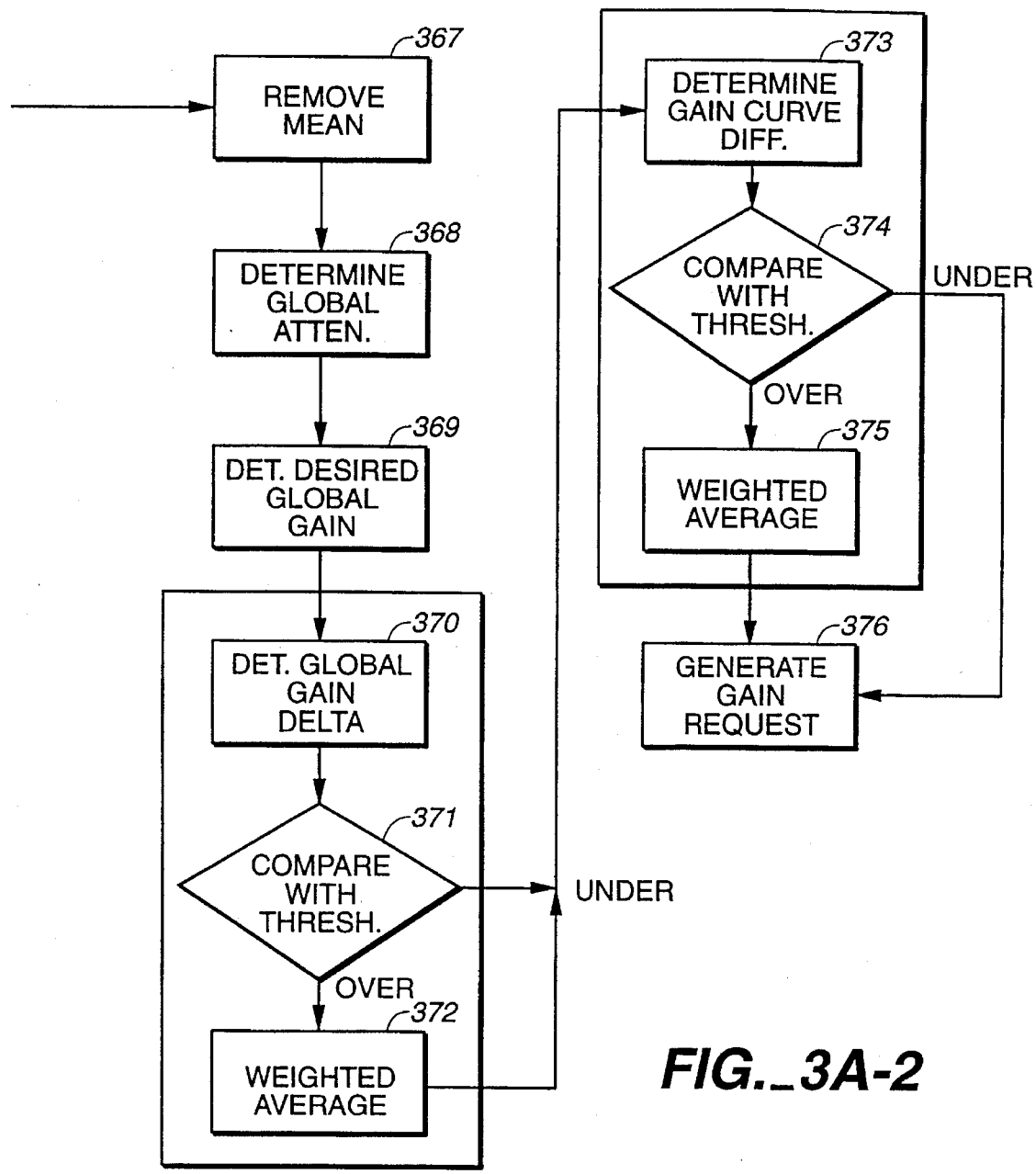
FIG._3A-2
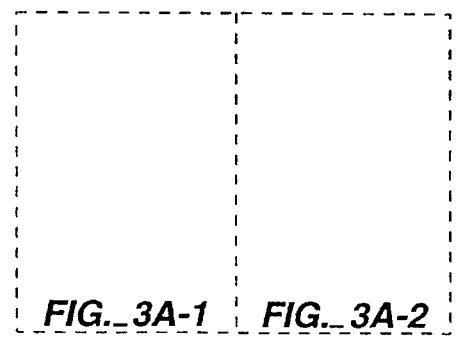
FIG._3A

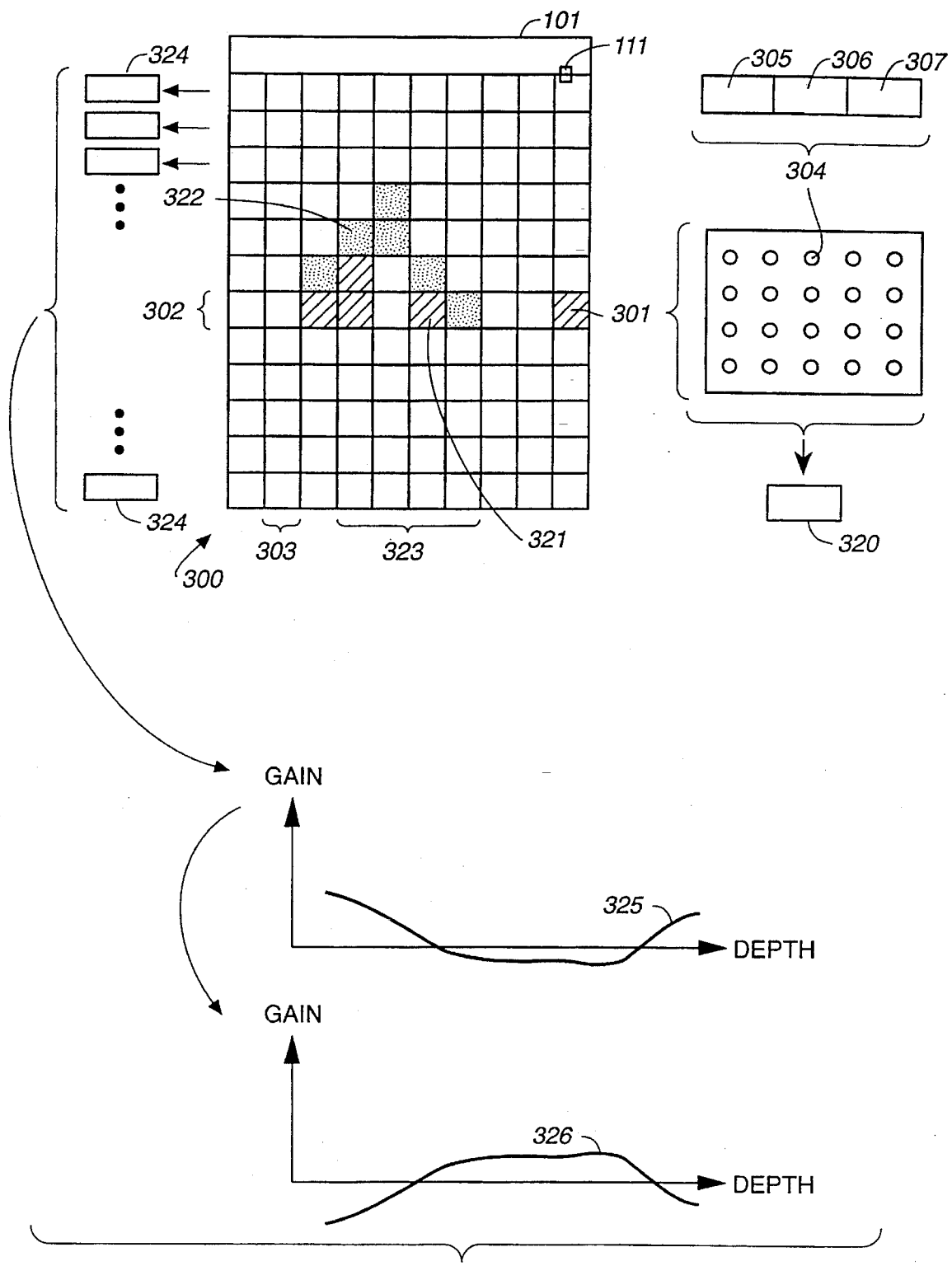
FIG._3B

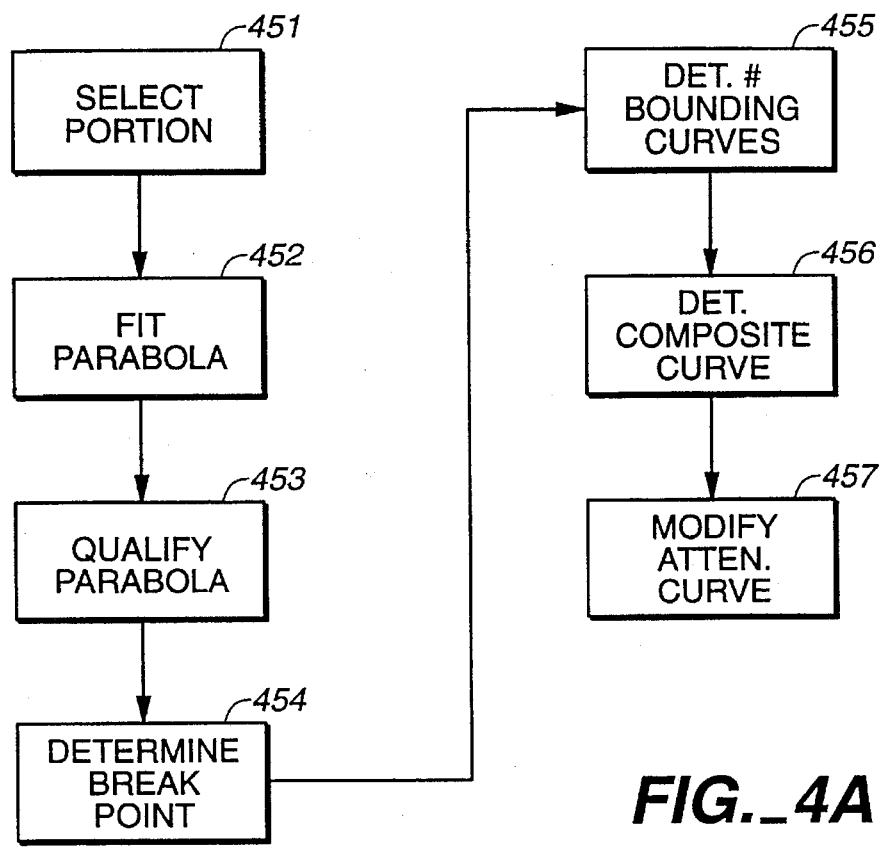
FIG._4A
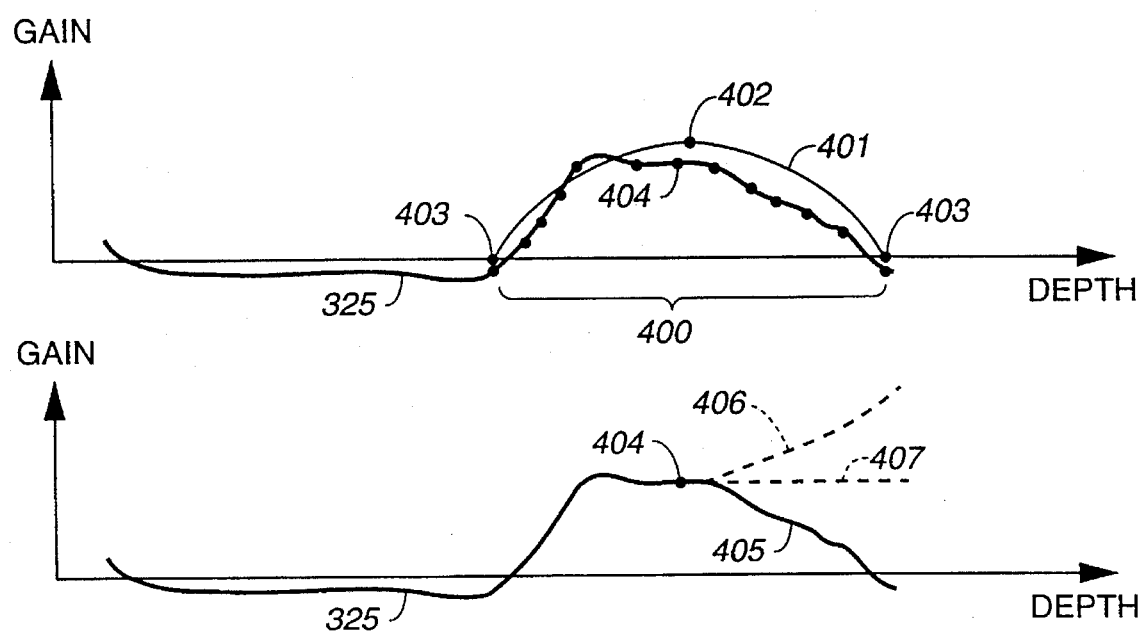
FIG._4B

AUTOMATIC GAIN COMPENSATION IN AN ULTRASOUND IMAGING SYSTEM

BACKGROUND OF THE INVENTION

1. Field of the Invention

This invention relates to automatic depth gain compensation in an ultrasound imaging system.

2. Description of Related Art

Ultrasound imaging systems generally operate by transmitting ultrasound signals from an ultrasound transducer or a plurality of transducer elements into a human body at a skin surface or within a body cavity, and receiving ultrasound signals reflected by objects or structures, such as organ tissue or other acoustic interfaces in a scan region (such as a scan plane) for the ultrasound signals, back to the ultrasound transducer. The reflected ultrasound signals are processed, and the processed ultrasound signals are displayed on a monitor or other display device for an operator to review. In general, objects or object boundaries, such as tissue or other acoustic interfaces, that reflect more energy may be shown more brightly on the display, while objects that reflect less energy may be shown less brightly on the display.

One problem that has arisen in the art is that ultrasound signals are generally attenuated as they penetrate into the region sought to be imaged, and further attenuated as they return after reflection. This "range attenuation" is in addition to known other sources of attenuation that arise due to the operation of the ultrasound system and which can be compensated for, such as energy dissipation away from a focal point. Moreover, range attenuation due to tissue penetration may be difficult or impossible to account for ahead of time, such as that due to voids (e.g., heart chambers or cysts), density changes, or other aspects of the geometry of the tissue or structures being imaged. If range attenuation is not compensated or is compensated incorrectly, the displayed ultrasound image may appear to wash out for greater ranges, may yield non-uniform contrast for some organ tissue, or may otherwise fail to properly represent organ tissue or other structures in the region sought to be imaged.

One method of addressing range attenuation has been to provide a set of slider potentiometers, or other manually operated controls, for the operator to adjust image gain for a set of range bands. For example, the imaging system may provide the operator with a set of eight sliders, each one for adjusting the image gain within a corresponding one of a set of eight range bands. This adjustment is sometimes called "depth gain compensation" or "time gain compensation" (because greater depth implies greater time for the ultrasound signals to reach a reflecting object or interface and return to the ultrasound transducer). Preferably, the operator should adjust the controls so that all regions of a uniform tissue in a field of view would have uniform brightness.

While this method of addressing range attenuation generally achieves the purpose of allowing the operator to manually compensate for range attenuation effects which cannot otherwise be anticipated by the ultrasound system, it suffers from several drawbacks. One drawback is that the operator does not know the actual attenuation due to range in advance of reviewing the image, and so may overcompensate or undercompensate from lack of knowledge. Similarly, upon reviewing the image, the operator may inaccurately compensate for actual image brightness in some bands, causing uneven displayed tissue brightness when that tissue extends across different range bands, and possibly other erroneous presentation of displayed tissue brightness. Another drawback is that the range bands for which the operator is able to adjust the gain are relatively wide, while the gain selected for each band is typically applied linearly throughout the entire width of a range band. Therefore, the operator may be unable to adjust the controls finely enough to adequately compensate for local range attenuation effects. Providing a larger number of range bands allows the operator finer control, but also increases the work the operator must do. It is therefore desirable to automate the procedure for depth (range) gain compensation. Still another drawback is that a changing image may require continual adjustment by the operator.

One method for automating range attenuation was shown in U.S. Pat. No. 4,662,380, titled "Adaptive Time Gain Compensation System for Ultrasound Imaging", issued May 5, 1987, in the name of James K. Riley. In this method, each pixel of the previously displayed image is processed to determine a histogram of intensity values for the pixels in the previously displayed image. The method includes a search for a set of peaks in the histogram band, so as to determine an automatic gain compensation curve in response to those peaks. This method is based on the concept that acoustic signal data will always produce a histogram in which a peak corresponds to a class of objects or structures: dark pools (such as blood), objects and structures of interest (such as organs and other tissue of interest), and bright reflectors (such as bony material or hard cysts). U.S. Pat. No. 5,313,948, titled "Ultrasonic Diagnostic Apparatus", issued Feb. 24, 1994, in the name of Masaru Murashita, et al., depends upon computing histograms for a set of several image depths; the peaks of the histograms are also used in the method disclosed in that patent to estimate image attenuation, and suffers from similar drawbacks, as shown herein below.

While these histogram-oriented approaches to range attenuation estimation generally achieve the purpose of automatic gain compensation responsive to depth or range, they suffer from the drawback that the histograms determined by these methods are potentially unreliable. First, the expected multiple histogram peaks do not always occur in practice; there may in some cases be no readily identifiable histogram peaks. Second, even when the expected histogram peaks do occur and can be discerned, they do not always fairly represent the brightness level to which automatic gain compensation should be applied.

Another method for automating range attenuation estimation is shown in U.S. Pat. No. 4,852,576, titled "Time Gain Compensation for Ultrasonic Medical Imaging Systems", issued Aug. 1, 1989, in the name of Dan Inbar, et al. In this method, scan-converted pixel data are divided into a sequence of range (depth) bands, and each depth band is averaged over the entire cross-range direction, to produce a sequence of values intended to represent average attenuation for that depth band. A set of straight line segments are fit to sections of the averaged attenuation values to determine an attenuation curve; the inverse of this attenuation curve then determines a computed gain curve.

While the method of U.S. Pat. No. 4,852,576 of addressing range attenuation generally achieves the purpose of automatic gain compensation responsive to depth (range), it suffers from the drawback that the averages determined by this method are computed over the entire cross-range extent of the data, and are thus likely to be erroneous. First, these averages are likely to include many regions whose attenuation at the selected depth band is outside the image nominal brightness range, such as dark pools and bright reflectors.

Second, these averages are determined without regard to cross-range gain rolloff at left and right edges of the image.

Another problem with the method of U.S. Pat. No. 4,852,576 for automatic depth gain compensation is that many computations on individual pixels of scan converted data are required, thus generating a need for extensive computational power. If a general purpose processor is used, this can lead to a very large time delay between the acquisition of the ultrasound acoustic signal and the determination and display of the gain compensated ultrasound acoustic signal. This latency makes it difficult to adjust a dynamically changing displayed image. Alternatively, if specialized hardware is designed to provide the automatic depth gain compensation, this can lead to an inflexible system that cannot easily be upgraded or otherwise modified.

Another problem with prior art automatic depth gain compensation systems is their failure to remove any previously applied gain compensation values from the acoustic signal data. This can lead to instabilities in automated applications of gain, particularly when the image intensity is dynamically changing.

Another problem with prior art automatic gain compensation methods is their failure to account for cross-range gain rolloff at the image edges.

Still another problem with prior art automatic gain compensation methods is the absence of means for responding to operator preferences for modifying gain compensation for extreme ranges.

It would also be advantageous to provide compensation for differences in image brightness that vary with the azimuth of the ultrasound signal data. Known methods of automatic adjustment of image gain, such as those cited herein above, do not perform azimuth gain compensation or any other kind of cross-range gain compensation. Moreover, if prior art methods of automatic depth gain compensation were somehow used instead to accomplish cross-range gain compensation, the cross-range gain compensation would also suffer from the same drawbacks as for depth gain compensation.

Accordingly, it would be advantageous to provide a system for automatic gain compensation, depth gain compensation, cross-range gain compensation, or a combination thereof, to supplement or to be used in lieu of gain compensation made by an operator.

SUMMARY OF THE INVENTION

The invention provides a method and system for automatic gain compensation in an ultrasound imaging system. The method and system may be used in place of, or in addition to, gain compensation selected by an operator. Gain compensation may be responsive to range, responsive to a cross-range parameter such as azimuth, or responsive to both. In a preferred embodiment, ultrasound imaging data is partitioned into relatively small zones (such as regions selected in response to range and in response to azimuth, and forming a pattern such as a 2D or 3D orthogonal grid having rows representative of range bands and columns representative of cross-range bands). In a preferred embodiment, at least one zone imaging value is determined for each zone, corresponding to at least one measure (such as a mean value, or a mean and a standard deviation) of one or more imaging values, such as an intensity value, for ultrasound signals reflected from objects or structures being imaged in that zone. One or more zone intensity values can be determined during real-time image acquisition by special-purpose processing hardware (such as dedicated averaging hardware or dedicated hardware for determining a median value), reducing the data rate enough that a general purpose processor can operate on the zone intensity value(s) to determine gain compensation values, also in real time.

In a preferred embodiment, each zone is examined to determine if its imaging values are within a selected numeric range (such as an intensity range expected to arise from tissue reflection), and only those zones whose zone intensity values are within that range, or within an adjusted intensity range, are used to estimate an attenuation curve (i.e., a mapping from depth to estimated attenuation). In a preferred embodiment, the zone intensity values are further selected to allow for cross-range attenuation, such as image intensity rolloff with increased azimuth from the center to the edges of the image. An attenuation curve is formed in response to the selected zone intensity values. A gain compensation curve is determined from the attenuation curve, and applied to the data, preferably before scan conversion of that data and preferably after log normalization.

In a preferred embodiment, the zone intensity value for each zone is an average of a set of imaging values, one or more for each data point in that zone. A mean imaging value for each zone is determined, and zones whose mean imaging value falls within a first selected range are marked as "valid". Zones proximate to (and preferably adjacent to) valid zones whose mean imaging values fall within a second selected intensity range are also marked as "valid". The second selected intensity range is preferably a range including the mean imaging value for the valid zone. The selection of zones in response to the second selected range is preferably repeated several times, as applied to further zones proximate to those zones successively marked "valid". Rows having at least a selected minimum number of valid zones are marked as valid rows. A set of row mean values, and an attenuation curve, are preferably determined in response to selected portions of valid rows, such as only those zones having a set of central cross-range values. The first and second selected intensity ranges, the selected number of valid zones for a valid row, and the selected portions of valid rows, may each be predetermined, may each be responsive to an operator control, or may each be responsive to the data (for example, having the response of a digital filter).

In a preferred embodiment, the range attenuation estimates are interpolated across invalid rows or extrapolated out to invalid rows, and filtered. The methods for interpolation, extrapolation, and filtering may be preselected, may be responsive to an operator control, or may be responsive to the data, and are preferably respectively linear interpolation, nearest neighbor extrapolation, and moving average filtering. The attenuation estimates collectively comprise the attenuation curve. The attenuation estimates may also be modified for selected curve segments, such as the segments at the ends of the attenuation curve. Each interpolated, extrapolated, filtered, and otherwise modified, attenuation curve is inverted, using an additive inverse or a multiplicative inverse as appropriate, to form a computed gain compensation curve, whose points represent gain compensation values, which may be further altered in response to a set of operator preferences (such as slider controls).

In a preferred embodiment, a global compensation gain to be applied is determined in response to a number of valid zones and a weighted average of imaging values for the entire image (preferably giving invalid zones zero weight). A computed global compensation gain delta is determined as the difference between a desired global gain and a global attenuation estimate. The desired global gain value is determined as a linear function of the ratio of the number of valid zones to the number of total zones; the global attenuation estimate is determined as a weighted average of imaging values, for all valid zones. If the global gain delta to be applied differs from a previous global gain delta by more than a selected threshold, the new actual global gain to be applied is determined as a weighted average of the old applied global gain and the new global gain delta; otherwise, the new global gain to be applied is unchanged from the old applied global gain. This comprises a case of an IIR (infinite impulse response) filter with a threshold for changes, although a more general digital filter could also be used, such as a nonlinear filter.

In a preferred embodiment, the gain compensation curve to be applied is preferably determined in response to the computed gain compensation curve in a similar manner. An IIR filter with a threshold for changes is preferably used, although more general digital filter could also be used, such as a nonlinear filter. However, for the gain compensation curve, the selected threshold for changes is considered to be reached if any point in the curve is changed by more than the selected threshold.

In a preferred embodiment, the method and system removes gain compensation otherwise introduced, such as by an operator or by previous automatic gain compensation activity, before determining the amount of automatic gain compensation. This allows the method and system to seek a preferred gain compensation curve as if no gain compensation had been applied previously, and is particularly advantageous when the image is dynamically changing, so as to avoid computed gain errors that might occur from applying a gain compensation curve from a previous image to a present image.

BRIEF DESCRIPTION OF THE DRAWINGS

FIG. 1 shows a block diagram of an ultrasound imaging system.

FIG. 2 shows a block diagram of gain signal paths and other signal paths in an ultrasound imaging system.

FIG. 3A shows a process flow diagram of an automatic gain compensation method. FIG. 3B shows data structures associated with the automatic gain compensation method. FIGS. 3A and 3B are collectively called FIG. 3 herein.

FIG. 4A shows a process flow diagram of a method of modifying the far field trend. FIG. 4B shows data structures associated with a method of modifying the far field trend. FIGS. 4A and 4B are collectively called FIG. 4 herein.

DESCRIPTION OF THE PREFERRED EMBODIMENTS

Inventions disclosed herein may be used in conjunction with one or more inventions shown in one or more of the following U.S. Patents and U.S. Patent Applications, assigned to the assigned of the present invention:

U.S. patent application Ser. No. 08/286,658, "Method and Apparatus for Receive Beamformer System", filed Aug. 5, 1993, in the name of inventors Nelson Wright, Christopher Cole, and Albert Gee;

U.S. patent application Ser. No. 08/286,268, "Method and Apparatus for Focus Control of Transmit and Receive Beamformer Systems", filed Aug. 5, 1993, in the name of inventors Albert Gee, Christopher Cole, and Nelson Wright;

U.S. patent application Ser. No. 08/286,510, "Method and Apparatus for Coherent Image Formation", filed Aug. 5, 1993, in the name of inventors Nelson Wright, Samuel Maslak, David Finger, and Albert Gee;

U.S. patent application Ser. No. 08/286,652, "Method and Apparatus for Transmit Beamformer System", filed Aug. 5, 1993, in the name of inventors Christopher Cole, Albert Gee, and Thomas Liu; and U.S. patent application Ser. No. 08/286,648, "Spectral Doppler Beamformer: Method and Apparatus for a Spectral Beamformer System", filed Aug. 5, 1993, in the name of inventors Samuel Maslak, Christopher Cole, and Joseph Petrofsky.

These patents and applications are each hereby incorporated by reference as if fully set forth herein, and are referred to collectively herein as the "incorporated disclosures".

In the following description, a preferred embodiment of the invention is described with regard to preferred process steps and data structures. Those skilled in the art would recognize, after perusal of this application, that embodiments of the invention may be implemented using one or more general purpose or special purpose processing elements operating under program control, and that modification of such general purpose or special purpose processing elements to implement the process steps and data structures described herein would not require undue experimentation.

OVERVIEW OF THE ULTRASOUND IMAGING SYSTEM

FIG. 1 shows a block diagram of an ultrasound imaging system.

Elements of the ultrasound imaging system are described herein with reference to automatic gain compensation and insofar as they relate to automatic gain compensation. Further information about ultrasound systems may be found by reference to the incorporated disclosures, by reference to "Digital Instrumentation of Diagnostic Medical Ultrasound", by Peter Fish (John Wiley & Sons 1990, 1992), or by reference to "Ultrasonic Bioinstrumentation", by Douglas A. Christensen (John Wiley & Sons 1988).

An ultrasound imaging system 100 comprises a probe comprising an ultrasound transducer array 101 having a set of transducer elements 111, for generating ultrasound acoustic signals 102 that are typically directed in a scan plane 103, typically behind a skin surface or in a body cavity such as in a human body. Although a 2D scan plane 103 is described, the scan plane 103 may also comprise a 3D scan region, such as if the transducer elements 111 are disposed in a planar array.

The acoustic signals 102 are reflected by objects or structures 104 in the scan plane 103, and return to the transducer elements 111. The transducer elements 111 convert the reflected ultrasound acoustic signals 102 into a set of corresponding electrical signals 105, and transmit those electrical signals 105 to an ultrasound image processor 106. The ultrasound image processor 106 produces, in response to the electrical signals 105, a display signal 107, which it transmits to a display device 108 (such as a monitor) for display to an operator.

In a preferred embodiment, the ultrasound transducer array 101 comprises a set of 128 transducer elements 111, disposed and controlled to operate on a like set of 128 channels. The acoustic signals 102 from the transducer elements 111 are each focused using time delay and/or phase adjustment to a selected depth within the scan plane 103, and the reflected acoustic signals 102 are collected.

The display device 108 may comprise gain adjustment controls 120, such as a set of sliders 121, each for adjusting gain for a selected range band. The operator may adjust gain for each range band by adjusting the slider 121 corresponding to that range band.

GAIN COMPENSATION IN THE ULTRASOUND IMAGING SYSTEM

FIG. 2 shows a block diagram of gain signal paths and other signal paths in an ultrasound imaging system.

In the ultrasound imaging system 100, the transducer elements 111 generating electrical signals 105 are coupled to transducer amplifiers 200. The transducer amplifiers 200 comprise variable gain amplifiers, and are coupled to a front-end gain control 201 from a gain allocation element 210. The gain allocation element 210 comprises special processing hardware operating in part under control of a software control element; it reviews any amplification gain to be applied by the ultrasound imaging system 100, and determines at what points in the ultrasound imaging system 100 those gains are to be applied.

In a preferred embodiment, the transducer amplifiers 200 comprise the low noise, variable gain amplifiers disclosed in U.S. patent application Ser. No. 08/286,648, "Spectral Doppler Beamformer: Method and Apparatus for a Spectral Beamformer System", filed Aug. 5, 1993, in the name of inventors Samuel Maslak, Christopher Cole, and Joseph Petrofsky, an incorporated disclosure. However, in alternative embodiments, other transducer amplifiers could be used.

The transducer amplifiers 200 are coupled to a receive beamformer 220, which collects the electrical signals 105 from each transducer element 111, forms a single scan line of acoustic samples therefrom, and generates an output signal 222. In a preferred embodiment, the signal 222 comprises a digital signal.

The receive beamformer 220 is coupled to and responsive to an aperture gain compensation control 221 from the gain allocation element 210. The aperture gain compensation control 221 directs the receive beamformer 220 to adjust the gain to compensate for changes in aperture.

In a preferred embodiment, the receive beamformer 220 comprises one like that disclosed in U.S. patent application Ser. No. 08/286,658, "Method and Apparatus for Receive Beamformer System", filed Aug. 5, 1993, in the name of inventors Nelson Wright, Christopher Cole, and Albert Gee, an incorporated disclosure. However, in alternative embodiments, other receive beamformers could be used.

In a preferred embodiment with a linear ultrasound transducer array 101, the aperture generally varies for imaging tissue with differing scan line orientation (such as an azimuth angle in a sector scan format) and differing origin on the ultrasound transducer array 101, particularly with regard to scan lines that originate at the middle of the ultrasound transducer array 101 and scan lines that originate at the ends of the ultrasound transducer array 101. It is also generally desired to maintain substantially constant the value of the f number, a ratio of depth to aperture size. Accordingly, as the aperture varies, it is generally desirable to vary the gain, on a scan line by scan line basis and in range along a scan line; the aperture gain compensation control 221 accounts for changes in gain responsive to changes in aperture.

In a preferred embodiment, the receive beamformer 220 comprises one like that described in U.S. patent application Ser. No. 08/286,658, "Method and Apparatus for Receive Beamformer System", filed Aug. 5, 1993, in the name of inventors Nelson Wright, Christopher Cole, and Albert Gee, an incorporated disclosure. (Further information about dynamic aperture gain is disclosed therein.) However, in alternative embodiments, other receive beamformers element designs could be used.

The signal 222 from the receive beamformer 220 is coupled to a detection element 230. The acoustic signals 102, and the signal 222, comprise a modulated pulse signal at a carrier frequency of between about 2 Megahertz and about 10 Megahertz, or another known carrier frequency. The detection element 230 detects the baseband signal 222 and generates an output signal 231. In a preferred embodiment, the signal 231 comprises a digital signal.

In a preferred embodiment, the detection element 230 may comprise a detector for either real or complex pulse baseband signals. For real signals, for a residual baseband frequency other than zero Hz, the detector may comprise a full wave rectifier and a low pass filter; such detectors are known in the art of signal processing. For complex (I and Q) signals already at a baseband frequency of zero Hz, the detector may comprise an element for determining the norm of the complex value, generally comprising means for squaring each of I and Q individually, summing the squares, and determining the square root of the sum; such complex detectors are known in the art of signal processing.

The signal 231 from the detection element 230 is coupled to an amplifier 240. The amplifier 240 comprises a log amplifier 241, a compression element 250, and a summer 260.

The signal 231 is coupled to the log amplifier 241. The signal 231 generally has a very wide dynamic range, generally of the order of about 60 dB or more. The log amplifier 241 transforms the magnitude of the signal 231 so that smaller quantization steps are used for relatively lower levels of the signal 231 and larger quantization steps are used for relatively higher levels of the signal 231, and generates an output signal 242. In alternative embodiments, the log amplifier 241 may also apply a scaling factor to the signal 242. In a preferred embodiment, the signal 242 comprises a digital signal.

The signal 242 from the log amplifier 241 is coupled to a compression element 250, which scales and clips the output of the log amplifier 241 into a range which generally matches the display capabilities of the display device 108, preferably an eight bit unsigned integer in the range zero to 255, or another known range suited to the display capabilities of the display device 108, and generates a signal 251. In a preferred embodiment, the signal 251 comprises a digital signal. Such compression elements are known in the art of signal processing.

The signal 251 from the compression element 250 is coupled to a summer 260, which applies gain to the signal 251, and generates a signal 262. In a preferred embodiment, the signal 262 comprises a digital signal. The summer 260 is coupled to and responsive to a back-end gain control 261 from the gain allocation element 210.

The signal 262 from the summer 260 is coupled to an automatic gain element 270, comprising an automatic gain preprocessor 271 and an automatic gain processor 272. The automatic gain element 270 determines a set of compensating gains to be applied to selected portions of the signal 251, and generates a gain request control 273 which is coupled to the gain allocation element 210 for applying those compensating gains.

In a preferred embodiment, the automatic gain preprocessor 271 comprises processing hardware for determining the zone mean values (described with FIG. 3) in response to the signal 262. In a preferred embodiment, the automatic gain preprocessor 271 comprises an ASIC made for this purpose. However, it would be clear to those skilled in the art that the function performed by the automatic gain preprocessor 271 could alternatively be performed by other means, that provision of such other means to perform the functions described herein would not involve undue experimentation, and that such other means would be within the scope and spirit of the invention.

Such other means include (1) special processing hardware to determine the zone mean values in an analog domain, such as by summation of electrical signals representative of acoustic signals along an ultrasound line (such as a scan line) or a portion thereof, (2) one or more digital signal processors operating under software control to determine the zone mean values digitally, (3) a general purpose commercial microprocessor dedicated for this task, such as an Intel x86 architecture processor like the 80486 processor, operating under software control to determine the zone mean values digitally, or (4) a network connection or other communication link to a logically remote means, such as one or more general purpose processors operating under software control, for determining the zone mean values digitally.

In a preferred embodiment, the electrical signals 105 are digitized before they are coupled to the receive beamformer 220, and the automatic gain preprocessor 271 operates on a digital signal 262. However, in alternative embodiments, the signal 262 may comprise an analog signal and may be processed by the automatic gain preprocessor 271 using analog processing, or using a combination of analog and digital processing. In alternative embodiments, the automatic gain preprocessor 271 may digitize its results (or couple its results to means for digitizing) so as to deliver a set of digital signals to the automatic gain processor 272.

In a preferred embodiment, the automatic gain processor 272 comprises a commercial digital signal microprocessor operating under software control to perform the functions and manipulate the data structures described with FIGS. 3 and 4, and is preferably the Texas Instruments TMS 320C31 digital signal processor product. However, it would be clear to those skilled in the art that the function performed by the automatic gain processor 272 could alternatively be performed by other means, that provision of such other means to perform the functions described herein would not involve undue experimentation, and that such other means would be within the scope and spirit of the invention.

Such other means include (1) one or more general purpose commercial microprocessors operating under software control, such as an Intel x86 architecture processor like the 80486 processor, (2) one or more general purpose processors or multiprocessor units having vectorized operations, operating under software control, or (3) a network connection or other communication link to a logically remote means, such as one or more general purpose processors operating under software control, like a Sun SPARCstation 10 workstation made by Sun Microsystems of California, for determining the zone means values digitally. As the zone mean values are preferably disposed in a matrix form when determined by the automatic gain preprocessor 271, a digital signal processor or other processor configured to perform vectorized operations at high speed is preferred.

In a preferred embodiment, the gain request control 273 comprises a digital signal configured to represent a set of amplification values for a sequence of points in a gain request curve. The sequence of points is preferably sampled frequently enough in range or cross-range parameter space (e.g., azimuth space) to prevent aliasing.

In a preferred embodiment, the gain request control 273 comprises a sequence of amplification values each comprising a single precision floating point number having 32 bits and being in an IEEE standard floating point format, and corresponding to a grid in which the spacing is four times the wavelength of the ultrasound acoustic signals 102. For example, when the center frequency of the acoustic signals 102 is about 5 Megahertz, and the speed of sound in tissue is about 1.54 millimeters per microsecond, sample spacing will be about 1.232 millimeters per amplification value.

In alternative embodiments, the format and precision of the gain request control 273, and the precision of the grid which the gain request control 273 corresponds to, may vary substantially from the specific values shown herein, and the invention may operate with only slight variations from precise values described herein.

The gain allocation element 210 is coupled to and is responsive to a focus gain control memory 274. The gain allocation element 210 and the automatic gain element 270 are both coupled to and are both responsive to the set of adjustment controls 120 from the operator, a master gain control element 275, and any other gain requests in the ultrasound system 100.

The focus gain control memory 274 comprises a set of gain adjustments to account for the differential energy dissipation of acoustic signals 102 from depths other than a focal point in the scan plane 103, as opposed to the focal point itself. Its gain adjustments are coupled to the gain allocation element 210, which determines where in the ultrasound imaging system 100 they are to be applied. In a preferred embodiment, the focus gain control memory 274 comprises a RAM, but it could alternatively comprise another memory means, such as ROM, PROM, EPROM, EEPROM, or another dedicated memory device.

The depth gain adjustment controls 120 from the operator, as described herein, comprise a set of gain adjustments selected by the operator. They are coupled to the gain allocation element 210, which determines where in the ultrasound imaging system 100 they are to be applied, and are coupled to the automatic gain element 270, which takes account for them (i.e., removes them) before determining the amount of automatic gain to be applied.

The master gain control element 275 comprises a gain adjustment to be made to the entire display signal 107. It is coupled to the gain allocation element 210, which determines where in the ultrasound imaging system 100 they are to be applied, and is coupled to the automatic gain element 270, which takes account for it (i.e., removes it) before determining the amount of automatic gain to be applied.

In a preferred embodiment, the gain allocation element 210 allocates all the gain from the automatic gain compensation to the summer 260. Those gains to be applied before the log amplifier 241 are computed by multiplication, while those gains to be applied after the log amplifier 241 are computed by addition (adding logarithms is equivalent to multiplying). To avoid having to convert from one form to another, the automatic gain element 270 preferably computes all gains in logarithmic form and the gain allocation element 210 preferably assigns all gains from the automatic gain element 270 to the summer 260.

The signal 262 is also coupled to a scan conversion element 280, which converts the signal 262, in its range and cross-range format, to the display signal 107, in a line and pixel format. Each pixel to be displayed on the display 108, with selected rectangular coordinates, is computed by the scan conversion element 280 in response to the range and cross-range coordinates, and imaging values, of selected points in the signal 262. For example, the scan conversion element 280 may compute an imaging value for a pixel to be a weighted average of nearby points in the signal 262. The pixels collectively comprise the display signal 107.

Scan conversion is known in the art of ultrasound imaging. Further information about scan conversion may be found by reference to the incorporated disclosures, or by reference to "A Scan Conversion Algorithm for Displaying Ultrasound Images", by S. C. Leavitt, B. F. Hunt, and H. G. Larsen (1988 Hewlett-Packard Journal, pp. 30–34).

The scan conversion element 280 couples the display signal 107 to the display device 108, which displays the processed image to the operator.

AUTOMATIC GAIN COMPENSATION METHOD

FIG. 3 shows a process flow diagram of an automatic gain compensation method, and associated data structures.

An ultrasound image 300 is divided into a set of zones 301, comprising a set of rows 302 and a set of columns 303. Each zone 301 comprises one or more acoustic data samples 304, each comprising a range value 305, a cross-range value 306 (such as an azimuth value), and at least one imaging value, preferably an intensity value 307.

In a preferred embodiment, there are between about 64 and about 2,048 zones laid out in a rectilinear grid.

The range value 305 corresponds to a depth from a selected position (e.g., a position of a selected transducer 111) on an ultrasound transducer array 101, and corresponds generally to vertical position in FIG. 3. Similarly, the cross-range value corresponds to a distance in a cross-range direction (e.g., laterally) along a linear ultrasound transducer array 101 to the acoustic data sample 304, and corresponds generally to horizontal position.

In a preferred embodiment, the zones 301 form a rectilinear grid. However, in alternative embodiments, the zones 301 may form another pattern, such as a hexagonal grid or a tessellation of other shapes. In alternative embodiments having more than two coordinate dimensions for each acoustic data sample 304, the zones 301 may form a pattern having three or more coordinate dimensions, such as an orthogonal grid having X position, Y position, Z position, and T (time offset) values.

The method of automatic gain compensation is shown with a linear ultrasound transducer array 101. However, the method is equally applicable to a sector ultrasound transducer array in which the cross-range value 306 represents an angle, a Vector™ ultrasound transducer array (having a variable angle, variable origin format, and described in U.S. Pat. Nos. 5,148,810; 5,235,986; and 5,261,408; all filed in the name of inventors Samuel Maslak et al., all assigned to the assignee of the present invention, and all hereby incorporated by reference as if fully set forth herein), or to a 3D ultrasound transducer array in which there are three or more coordinates, such as three positional axes or other coordinates, needed to represent an acoustic data sample 304 (in addition to its intensity value 307).

A first alternative embodiment of a 3D ultrasound transducer array 101 may comprise a two dimensional array of transducer elements 111 (such as a rectilinear grid or a hexagonal grid), disposed to generate a set of parallel scan planes 103 forming a solid region in which the acoustic signals 102 are transmitted and reflected. A second alternative embodiment of a 3D ultrasound transducer array 101 may comprise a one dimensional array of transducer elements 111 (such as a linear ultrasound transducer array 101), disposed by means of movement during an ultrasound scan to generate a set of sequential scan planes 103 collectively forming a solid region in which the acoustic signals 102 are transmitted and reflected.

In an alternative embodiment, a 3D or 4D ultrasound transducer array 101 may comprise, for each acoustic data sample 304, a coordinate representing a time axis, particularly for making ultrasound images for objects or images which are expected to change with time (e.g., which change periodically with time). For example, in ultrasound imaging, heart tissue is commonly moving with respect to the ultrasound transducer array 101. In this alternative embodiment, the acoustic data samples 304 may be assigned a coordinate representing the time they are received or a time offset they are received within a periodic time frame (such as a periodic time frame that repeats with the heartbeat of the heart tissue). The zones 301 may form a orthogonal grid comprising a set of time coordinate values; when (at the step 351) acoustic data samples 304 are each allocated to zones 301 and the zone mean values 320 are determined, the zone mean values 320 may comprise time averages of acoustic data samples 304.

The intensity value 307 corresponds to one or more measures of intensity of the acoustic signal, such as the logarithm of the value of the acoustic signal when the latter is detected at the ultrasound transducer array 101 after reflection. Alternatively, the intensity value 307 may correspond to other measures relevant to the art of ultrasound imaging. Other measures may include (a) the square of the voltage of the acoustic signal, (b) the excess of the acoustic signal over a selected noise threshold, or (c) a combination of intensity values from a false-color image.

At a step 351, the automatic gain preprocessor 271 allocates each acoustic data sample 304 to a zone 301, and for each zone 301 a zone mean value 320. The set of zone mean values 320 are coupled to the automatic gain processor 272 for further processing. The zone mean value 320 is preferably a weighted arithmetic average of the intensity values 307 for all acoustic data samples 304 in the zone 301, with the weights set equal to 1.0. However, alternative measures, such as a geometric average or a median value, could be used. In a preferred embodiment, the operation of dividing by the sum of the weights in calculating the weighted average can be performed by the automatic gain processor 272. This simplifies the operation of, and allows a more efficient design for hardware implementation of, the automatic gain preprocessor 271.

In alternative embodiments, the zone mean value 320 need not be determined with exclusive regard for acoustic data samples 304 in the exact zone 301, but may also be responsive to acoustic data samples 304 in neighboring zones 301. For example, in an alternative embodiment, the zone mean value 320 for a particular zone 301 may be determined by computing a weighted average of intensity values 307 for acoustic data samples 304, where the weights for the weighted average are proportional to a Gaussian function of the distance of each acoustic data sample 304 from a representative point (such as a center point) in that zone 301.

In a preferred embodiment, the automatic gain preprocessor 271 selects 512 zones, 32 deep (the set of depth values is divided into 32 categories) by 16 across (the set of cross-range values is divided into 16 categories). The number of zones and the assignment of acoustic data samples 304 to zones 301 responsive to depth and cross-range need not be predetermined, but may be responsive to a control set by the operator, or may be responsive to the data points in the signal 262.

In a preferred embodiment, the zones 301 have boundaries which are determined so as to substantially equalize the number of samples in each zone 301. Zones 301 in a final column or a final row are assigned a number of samples equal to the remainder after the samples are divided among the other rows and columns. In alternative embodiments, the zone boundaries may be determined so that the number of samples in each zone, if not exactly the same, is close to the average.

As used herein, the phrase "responsive to the data points in the signal 262" refers to being responsive to features of those data points, including their range, cross-range, and imaging values (such as intensity values), their zone mean values 320, to statistical measures thereof, such as a population or subpopulation mean, median, variance, skew, or kurtosis, and includes adaptive responsiveness thereto.

At a step 352, the automatic gain processor 272 compensates for any previous gain request control 273 (and for any other gain requests applied by the ultrasound imaging system 100) by subtracting a set of gain coefficients from the previous gain request control 273 from the zone mean values 320. Because the gain request control 273 is representative of the logarithm of the gain, subtracting gain coefficients is an equivalent of removing a multiplicative gain.

To perform this step 352, the automatic gain processor 272 records each gain control request 273 so that it can be subtracted out in a next pass. As noted herein, the recorded gain control request 273 does not necessarily have the same granularity as the zones 301 or the acoustic data samples 304. Accordingly, first, the recorded gain control request 273 is interpolated to the sample spacing of the acoustic data samples 304. Second, the interpolated values are averaged in like manner to determination of the zone mean value 320, to produce a set of gain control values having the same granularity as the zones 301. Third, the gain control values are subtracted from the zone mean values 320 row by row.

In a preferred embodiment, the gain coefficients from all previous gain request controls 273 are removed before the automatic gain processor 272 performs the rest of the method of automatic gain compensation. However, in an alternative embodiment, the automatic gain processor 272 might remove previous gain request controls 273 for only every second image, every third image, or less often. In another alternative embodiment, the automatic gain processor 272 might maintain information regarding previous attenuation estimates, and remove previous gain request controls 273 only when changes in attenuation estimates exceed a selected threshold (such as 1 dB for any estimate point, or another selected threshold widely ranging from zero to about 6 dB or more). These alternative embodiments may be particularly advantageous when the image is substantially stable and processing power is limited.

At a sequence of steps 353, 354, 355, 356, 357, and 358, the automatic gain processor 272 marks a set of zones 301 as valid. The automatic gain processor 272 marks certain zones 301 (a first set 321) as valid, responsive only to their zone mean values 320. The automatic gain processor 272 then iterates, expanding the number of valid zones 301 by successively marking additional zones (a second set 322) as also being valid, responsive to their being adjacent to any zone 301 already marked valid and also having a zone mean value 320 near that of a valid zone 301.

In alternative embodiments, additional zones in the second set 322 may be selected in response to being neighbors of zones 301 already marked valid. As used herein, a first zone 301 is a "neighbor" of a second zone 301 when the coordinate distance in range and cross-range directions, from any coordinate point within one zone to any coordinate point within another zone, is less than a selected maximum coordinate distance. Where the first zone 301 is adjacent to the second zone 301 the selected maximum coordinate distance is zero.

This method of marking zones 301 valid in response to their zone mean values 320 is suitable for excluding zones that comprise primarily dark pools or bright reflectors, thereby increasing the likelihood that valid zones 301 comprise tissue or other objects of interest. It has also been observed that zones 301 near tissue are also likely to comprise tissue or other objects of interest, if they have zone mean values 320 near the zone mean value 320 of the tissue. Zones 301 near these nearby valid zones 301 are also likely to comprise tissue or other objects of interest, if they also have zone mean values 320 near the zone mean value of the nearby valid zones 301, and so on, iteratively.

In a sequence of steps 353 and 354, the automatic gain processor 272 marks a first set 321 of zones 301 as valid. As used herein, the term "valid" does not refer to the quality of the acoustic signals 102 collected therein; instead it refers to whether the automatic gain processor 272 will ultimately determine attenuation estimates from the data therein.

At a step 353, the automatic gain processor 272 determines a valid range of zone mean values 320, within which the zone mean values 320 for the first set 321 of valid zones 301 must fall. To perform step 353, the automatic gain processor 272 examines the zone mean values 320 to find their population minimum and maximum values, and selects a function of these two values as the endpoints of the valid range in response thereto.

In a preferred embodiment, the selected endpoints of the valid range are at 25% of the full range and 75% of the full range. For example, if the population minimum zone mean value 320 is 8 dB and the population maximum zone mean value 320 is 60 dB, the valid range would be from 21 dB to 47 dB. However, in alternative embodiments, the selected endpoints of the valid range may vary widely, from just above 0% to about 40% or more at the minimum end and from just below 100% to about 60% or less at the maximum end. As a result, zones 301 comprising primarily dark regions or bright reflectors will be excluded from the first set 321.

The selected endpoints need not be predetermined, but may also be responsive to a control set by the operator, or may be responsive to the data points in the signal 262.

At a step 354, the automatic gain processor 272 marks those zones 301 having zone mean values 320 within the valid range for the first set 321 as being valid.

At a sequence of steps 355, 356, and 357, the automatic gain processor 272 marks a second set 322 of zones 301, neighbors of zones 301 already marked valid, as also valid, in a similar manner as in the sequence of steps 353 and 354.

The sequence of steps 355, 356, and 357, are iterated to repeatedly select and mark valid additional zones 301 that are neighbors of zones 301 already marked valid. Each time a zone 301 is marked valid, it is collected into the set of valid zones 301 (whether marked valid as part of the first set 321 or the second set 322), so that successive iterations generally expand the number of valid zones 301. Preferably, five iterations are performed. However, in alternative embodiments, the number of iterations may vary widely, from zero to about a dozen or more.

At a step 355, the automatic gain processor 272 selects zones 301 that are not already marked valid and are neighbors of at least one valid zone 301 (whether the valid zone 301 was marked valid as part of the first set 321 or the second set 322). To perform this step 355, the automatic gain processor 272 determines, for each particular zone 301 not already marked valid, if any of its neighbors are marked valid. If so, the zone 301 is a possible candidate for membership in the second set 322.

In a preferred embodiment, the neighbors of a particular zone 301 are those zones 301 adjacent in any of a set of eight checkerboard directions in a rectilinear grid (i.e., north, northeast, east, southeast, south, southwest, west, and northwest). However, in alternative embodiments, the neighbors of a particular zone 301 could be those zones 301 within a selected distance from that particular zone 301, where that selected distance may vary widely, from near zero to about 6 zones 301 or more, depending on the granularity, grid pattern, and total number of the zones 301.

The selected distance for neighbor zones 301 need not be predetermined, but may be responsive to a control set by the operator, or may be responsive to the data points in the signal 262.

At a step 356, the automatic gain processor 272 determines, for each possible candidate zone 301, whether its zone mean value 320 is within an adjusted valid range. To perform this step 356, the automatic gain processor 272 determines if the zone mean value 320 of the candidate zone 301 is within a second selected distance, preferably plus or minus 2 dB, from a zone mean value 320 for any neighbor zone 301 already marked valid. For example, if a zone mean value 320 of a first zone 301 marked valid is 40 dB, the second zone 301 would be marked valid if its zone mean value 320 is between 38 dB and 42 dB. However, in alternative embodiments, the second selected distance may vary widely, from just about (plus or minus) zero to about (plus or minus) 6 dB or more.

The second selected distance need not be predetermined, but may be responsive to a control set by the operator, or may be responsive to the data points in the signal 262. For example, the second selected distance may be a selected fraction, e.g., 1/30, of the population dynamic range.

At a step 357, the automatic gain processor 272 marks those zones 301 having zone mean values 320 meeting the tests for entry in the second set 322 as valid.

At a step 358, the automatic gain processor 272 determines whether to continue iterating marking zones 301 as valid. If so, the automatic gain processor 272 continues with the step 355. Otherwise, the automatic gain processor 272 continues with the step 359. Preferably, iteration is performed five times.

The selected number of times that iteration is performed need not be predetermined, but may be responsive to a control set by the operator, or may be responsive to the data points in the signal 262.

At a sequence of steps 359, 360, and 361, the automatic gain processor 272 marks a set of rows 302 as valid.

At a step 359, the automatic gain processor 272 selects a central region 323 for each row 302, comprising a set of central columns 303 a selected distance to each side of the center of the row 302. This minimizes any effect on the attenuation curve 325 of cross-range gain rolloff (such as lateral gain rolloff); the central region 323 is preferably selected because it is expected that is where the most interesting part of the image should be located. In alternative embodiments, other methods for minimizing the effect of cross-range gain rolloff at the image edges could be used in addition or instead of selection of the central region 323.

In a preferred embodiment, the selected distance for the step 359 is two to three columns 303, so that four to six total columns 303 are selected. However, in alternative embodiments, the selected distance for the step 359 may vary widely, from one column 303 to about six columns 303 or more, depending on the granularity and number of the zones 301.

The selected distance need not be predetermined, but may be responsive to a control set by the operator, or may be responsive to the data points in the signal 262.

At a step 360, the automatic gain processor 272 counts the valid zones 301 in the central region 323 for each row 302.

At a step 361, the automatic gain processor 272 marks those rows 302 which have a selected count of valid zones 301 in the central region 323 for that row 302. In a preferred embodiment, the selected count of valid zones 301 is between two-thirds of the zones 301 and all of the zones 301 (e.g., for six zones 301 in the central region 323, between four and six valid zones 301). However, in alternative embodiments, the selected count of valid zones 301 may vary widely from just above zero to nearly all of the zones 301 in the central region 323.

The selected count need not be predetermined, but may be responsive to a control set by the operator, or may be responsive to the data points in the signal 262.

At a step 362, the automatic gain processor 272 determines a weighted row mean value 324 for each valid row 302. As used herein, a "row mean value" is a value assigned to a selected row 302, responsive to the zone mean values 320 for zones 301 in that row 302. The weights are multiplied by respective zone mean values 320, summed, and this sum is divided by the sum of the weights. In a preferred embodiment, the weight assigned to valid zones 301 is one and the weight assigned to invalid zones 301 is zero. Thus, valid zones 301 are each counted equally, and invalid zones 301 are not considered at all, so that the weighted row mean value 324 is determined in response to zones 301 believed to be valid tissue only.

In an alternative embodiment, the weight assigned to each particular zone 301 may be responsive to the iteration on which that particular zone 301 was marked valid; for example, those zones 301 marked valid in the first set 321 or marked valid in the first iteration for the second set 322 would be given a weight of 1.0, those zones 301 marked valid in the second iteration for the second set 322 would be given a weight of 0.8, those zones 301 marked valid in the third iteration for the second set 322 would be given a weight of 0.6, those zones 301 marked valid in the fourth iteration for the second set 322 would be given a weight of 0.4, those zones 301 marked valid in the fifth iteration for the second set 322 would be given a weight of 0.2, and those zones 301 marked invalid (i.e., never marked valid) would be given a weight of zero. Similarly to the case where all weights are either one or zero, the weights are multiplied by respective zone mean values 320, summed, and this sum is divided by the sum of the weights.

In additional alternative embodiments, other weights are possible, including assigning small but non-zero weights to those zones 301 marked invalid.

The weights assigned to zones 301 for determining the weighted row mean value 324 need not be predetermined, but may be responsive to a control set by the operator, or may be responsive to the data points in the signal 262.

At a step 363, the automatic gain processor 272 interpolates and extrapolates row mean values 324 for each invalid row 302, in response to row mean values 324 for valid rows 302. Interpolation is used when a row 302 for which a row mean value 324 is to be computed is flanked by rows 302; extrapolation is used when a row 302 for which a row mean value 324 is to be computed is to one side of a valid row 302 and has no valid row 302 to the other side. The method of interpolation is preferably unweighted linear interpolation; linear interpolation is known in the art of signal processing. However, in alternative embodiments, the method of interpolation may be weighted linear interpolation, or weighted or unweighted nonlinear interpolation. The method of extrapolation is preferably endpoint extension. However, in alternative embodiments, the method of extrapolation may be weighted or unweighted linear extrapolation, or weighted or unweighted nonlinear extrapolation.

The methods and weights for interpolation and extrapolation need not be preselected, but may be responsive to a control set by the operator, or may be responsive to the data points in the signal 262.

At a step 364, the automatic gain processor 272 modifies the far field trend, as described with FIG. 4.

At a step 365, the automatic gain processor 272 filters the interpolated row mean values 324. The method of filtering is preferably a moving average filter with a collapsing region of support. Moving average filters are known in the art of signal processing. The method of filtering may be preselected, may be responsive to an operator control, or may be responsive to the data. In alternative embodiments, other methods of filtering besides a moving average filter may be used.

In a preferred embodiment, the moving average filter comprises seven adjacent row mean values 324 centered on the row mean value 324 to be filtered. Where the row mean value 324 to be filtered is near an end row, so that seven adjacent row mean values 324 are not available for averaging (i.e., the row mean value 324 is the end row or within two rows thereof), the moving average filter window is reduced. Thus, the row mean value 324 for the end row is unfiltered, the row mean value 324 adjacent to the end row is filtered with a moving average window of three points, and the row mean value 324 two rows from the end row is filtered with a moving average window of five points.

However, in alternative embodiments, the selection of the particular window size for the moving average may vary widely, from about three points to about a dozen points or more, depending on the granularity and number of row mean values 324 or zones 301.

The sequence of row mean values 324, after interpolation, extrapolation, modification of the far field trend, and filtering, comprises an attenuation curve 325.

At a step 366, the automatic gain processor 272 inverts the attenuation curve 325 to produce a computed gain compensation curve 326. Thus, the computed gain compensation curve 326 should invert the effect of the attenuation curve 325 and thus compensate for attenuation.

As used herein, the terms "inverse" and "inverts" (when used for an attenuation curve, a gain curve, or their sample points) refer to additive inverse (multiplication by −1) or multiplicative inverse (computing a reciprocal), as appropriate for the format of the data. In a preferred embodiment where the data is in a logarithmic format, an additive inverse is used, because this is the equivalent of a multiplicative inverse for data in a non-logarithmic format.

The automatic gain processor 272 performs the step 366 by inverting each sample point of the attenuation curve 325 to produce a corresponding sample point of the computed gain compensation curve 326. In a preferred embodiment where the each sample represents a dB value to be added as a gain request control 273, the automatic gain processor 272 computes the arithmetic inverse for each element by simply multiplying that element by −1.

At a step 367, the automatic gain processor 272 removes a mean value from the computed gain curve 326. The automatic gain processor 272 performs this step by first, determining a mean value present in the computed gain curve 326, and second, subtracting that mean value from each element of the computed gain curve 326.

At a step 368, the automatic gain processor 272 determines a global attenuation estimate from the zone mean values. To perform this step 368, the automatic gain processor 272 determines a weighted population mean for all zone mean values 320. In a preferred embodiment, the weight assigned to valid zones 301 is one and the weight assigned to invalid zones 301 is zero. The weights are multiplied by respective zone mean values 320, summed, and this sum is divided by the sum of the weights. Thus, valid zones 301 are each counted equally, and invalid zones 301 are not considered at all, so that the weighted row mean value 324 is determined in response to valid tissue only.

In an alternative embodiment, the weight assigned to each particular zone 301 may be responsive to the iteration on which that particular zone 301 was marked valid; for example, those zones 301 marked valid in the first set 332 or marked valid in the first iteration would be given a weight of 1.0, those zones 301 marked valid in the second iteration would be given a weight of 0.8, those zones 301 marked valid in the third iteration would be given a weight of 0.6, those zones 301 marked valid in the fourth iteration would be given a weight of 0.4, those zones 301 marked valid in the fifth iteration would be given a weight of 0.2, and those zones 301 marked invalid would be given a weight of zero. Similarly to the case where the weights are either one or zero, the weights are multiplied by respective zone mean values 320, summed, and this sum is divided by the sum of the weights.

In additional alternative embodiments, other weights are possible, including assigning small but non-zero weights to those zones 301 marked invalid.

The weights assigned to zones 301 for determining the weighted population mean need not be predetermined, but may be responsive to a control set by the operator, or may be responsive to the data points in the signal 262.

At a step 369, the weighted population mean is adjusted by combining it with a desired global gain value; the desired global gain value is (16X+2) dB (for a compression dynamic range of about 50 dB), where X is the percentage of zones 301 marked valid. There is generally a positive statistical correlation between the number of zones 301 marked valid and the actual global gain applied by the operator using manual gain control. Accordingly, this offset factor is added to account for the likely action of the operator in selecting the global gain.

In alternative embodiments, the offset value may be determined using widely varying linear coefficients, or may be determined using a nonlinear function of the percentage of zones 301 marked valid. For example, the slope (preferably 16) may widely vary from about 12 or less to about 20 or more, and the intercept (preferably 2) may widely vary from zero or less to 10 or more, for a compression dynamic range of about 50 dB. For a different dynamic range, these slope and intercept parameters should be scaled proportionately, larger for a larger dynamic range, smaller for a smaller dynamic range.

If the operator desires to further increase the gain beyond the desired global gain determined in the step 369, the operator may set a control, such as a master gain control or other slider potentiometer, to indicate that additional global gain is desired. This additional gain is added to the desired global gain.

At a sequence of steps 370, 371, and 372, the automatic gain processor 272 determines an applied global gain in response to the global gain delta and an applied global gain, using an IIR (infinite impulse response) filter, with a threshold for changes. As noted herein, a more general digital filter, such as a nonlinear filter, could also be used.

At a step 370, the automatic gain processor 272 determines a global gain delta, by subtracting the global attenuation estimate (determined in the step 368) from the desired global gain (determined in the step 369).

At a step 371, the automatic gain processor 272 compares the absolute value of the global gain delta determined in the step 370 with a selected threshold. If the absolute value of the global gain delta exceeds the selected threshold, the automatic gain processor 272 continues with the step 372. Otherwise, the automatic gain processor 272 assigns the old applied global gain value to the new applied global gain, and continues with the step 373.

In a preferred embodiment, the selected threshold is about 2 dB. However, in alternative embodiments, the selected threshold may vary widely from zero to about 10 dB or more.

The selected threshold need not be predetermined, but may be responsive to a control set by the operator, or may be responsive to the data points in the signal 262.

At a step 372, the automatic gain processor 272 determines a mixture of the global gain delta and an old applied global gain, and assigns this value to the new applied global gain. In a preferred embodiment, the mixture is a weighted sum of the global gain delta and the old applied global gain. In a preferred embodiment, the weight assigned the global gain delta is 0.5 and the weight assigned the old applied global gain is 1.0. However, in alternative embodiments, the weights assigned the global gain delta and the old applied global gain may vary widely from just about zero to just about one.

In alternative embodiments, the automatic gain processor 272 may determine the mixture in response to M past values of the applied global gain (including the just-determined new applied global gain) and N past values of the global gain delta, i.e., as a weighted sum thereof. M and N are always non-negative. This is an example of determining the mixture using an IIR filter with multiple taps. A more general digital filter, such as a non-linear filter, could also be used.

At a sequence of steps 373, 374, and 375, the automatic gain processor 272 determines an applied gain curve 326 in response to the new gain curve 326 and an old gain curve 326, using an IIR filter, with a threshold for changes. A more general digital filter, such as a non-linear filter, could also be used.

At a step 373, the automatic gain processor 272 determines an absolute value of a difference between the new gain curve 326 and an old gain curve 326. The difference is determined at each point in the gain curve 326.

At a step 374, the automatic gain processor 272 compares the absolute value of the difference determined in the step 373 with a selected threshold. In a preferred embodiment, the selected threshold is about 1 dB. However, in alternative embodiments, the selected threshold may vary widely from zero to about 10 dB or more. If any point in the gain curve 326 differs by more than the selected threshold, the selected threshold is considered to be exceeded. If the difference exceeds the selected threshold, the automatic gain processor 272 continues with the step 375. Otherwise, the automatic gain processor 272, assigns the old gain curve values to the applied gain curve, and continues with the step 376.

The selected threshold need not be predetermined, but may be responsive to a control set by the operator, or may be responsive to the data points in the signal 262.

At a step 375, the automatic gain processor 272 determines a mixture of the new gain curve 326 and an old gain curve 326. In a preferred embodiment, the mixture is a linear weighted sum of the new gain curve 326 and an old gain curve 326. In a preferred embodiment, the weight assigned the new gain curve 326 is 0.5 and the weight assigned the old gain curve 326 is 0.5. However, in alternative embodiments, the weights assigned the new gain curve and the old gain curve may vary widely from just about zero to just about one. The mixture is determined for each point in the gain curve 326, and the resulting values assigned to the applied gain curve.

At a step 376, the automatic gain processor 272 generates a gain request control 273 in accordance with the applied global gain determined in the steps 371 or 372, and the applied gain curve determined in the steps 374 or 375.

While this method of automatic gain compensation is described for depth (range) gain compensation, an alternative embodiment performs the same or similar steps for cross-range (cross-depth) gain compensation, such as for azimuth gain compensation. Those skilled in the art would recognize, after perusal of this application, that it would require only slight modification of the method steps, data structures, or apparatus shown herein to perform gain compensation in response to cross-range, in response to another positional dimension or time dimension, or in response to more than one such dimension (such as both cross-range and depth), or in response to a combination of two or more such dimensions (such as a combination of depth and time). Those skilled in the art would also recognize that such slight modification would not require any undue experimentation, and is within the scope and spirit of the present invention.

While this method of automatic gain compensation is described for operation with acoustic data, an alternative embodiment performs the same or similar steps for scan-converted data. Those skilled in the art would recognize, after perusal of this application, that it would require only slight modification of the method steps, data structures, or apparatus shown herein to perform gain compensation in response to scan-converted data. Those skilled in the art would also recognize that such slight modification would not require any undue experimentation, and is within the scope and spirit of the present invention.

MODIFYING THE FAR FIELD TREND

FIG. 4 shows a process flow diagram of a method of modifying the far field trend, and associated data structures.

In a preferred embodiment of the invention, a selected portion of the attenuation curve 325 is modified to account for typical treatment by the operator using a set of gain adjustment controls 120. It has been observed that the gain curve 326 at deepest depths (farthest ranges, or the "far field") is sometimes set by the operator using a set of gain adjustment controls 120 to reduce the gain in that portion of the gain curve 326, even when the attenuation curve 325 would otherwise indicate that the gain should be higher. This may be due to operator desire to eliminate background clutter from the far field of the display 108. This situation is correlated with having an attenuation curve with a generally parabolic nature in that part of the curve corresponding to the far field of the intensity image, and having a peak which is larger in gain than the endpoints of the parabola.

At a step 451, the automatic gain processor 272 selects a portion 400 of the attenuation curve 325. Preferably, this portion 400 comprises the distant half of the attenuation curve 325. However, in alternative embodiments, this portion 400 of the attenuation curve 325 may comprise a fraction of the attenuation curve 325 that may vary widely from just about none to 75% of the attenuation curve 325 or more.

In alternative embodiments, the selected portion 400 also comprises a fraction of the attenuation curve 325 closer in range. For example, in ultrasound imaging of a human body, the fraction of the attenuation curve 325 closer in range often comprises fatty tissue that brightly reflects the acoustic signals 102. In alternative embodiments, there may be a plurality of selected portions 400, and the automatic gain processor 272 may perform this method of modifying the far field trend, or a variant thereof, for each selected portion 400.

At a step 452, the automatic gain processor 272 fits a fitted curve 401 (preferably, a parabola) in a least-mean-square sense, to the selected portion 400 of the attenuation curve 325. Fitting a parabola to a curve in a least-mean-square sense is known in the art of numerical analysis.

In alternative embodiments, the fitted curve 401 may comprise a shape other than a parabola, such as a polynomial function greater than second degree, a weighted sum of exponential functions, another convergent infinite series, or a combination of these possibilities.

At a step 453, the automatic gain processor 272 qualifies the fitted curve 401 for far field modification. To perform this step 453, the automatic gain processor 272 determines if a fitted curve peak 402 of the fitted curve 401 is higher (larger in gain) than each of the endpoints 403 of the fitted curve 401. If so, the fitted curve 401 qualifies, and the automatic gain processor 272 proceeds with the step 454. Otherwise, the automatic gain processor 272 terminates this method and makes no modification to the far field of the attenuation curve 325.

At a step 454, the automatic gain processor 272 determines a sample point 404 (i.e., an actual sample point from the attenuation curve 325) nearest in range to the fitted curve peak 402. In practice, there are two points, one on each side, that are near the fitted curve peak 402; accordingly, the sample point 404 is the nearer of these two.

At a step 455, the automatic gain processor 272 determines a first bounding curve 405 (comprising the original attenuation curve 325 from the sample point 404 outward to deeper depths or farther ranges), and a second bounding curve 406 (comprising the negative of the first bounding curve offset by twice the magnitude of the sample point 404, so that the magnitudes corresponding to sample point 404 on each bounding curve are equal).

At a step 456, the automatic gain processor 272 determines a composite curve 407, comprising a mixture of the first bounding curve 405 and the second bounding curve 406. In a preferred embodiment, the mixture is a linear weighted sum of the first bounding curve 405 and the second bounding curve 406. In a preferred embodiment, the weight assigned the first bounding curve 405 is 0.5 and the weight assigned the second bounding curve 406 is 0.5. With this weighting, there is no additional gain change from the sample point 404 outward.

However, in alternative embodiments, the weights assigned the first bounding curve 405 and the second bounding curve 406 may vary widely from about zero to about one.

At a step 457, the automatic gain processor 272 modifies the attenuation curve 325 to conform to the composite curve 407.

ALTERNATIVE EMBODIMENTS

Although preferred embodiments are disclosed herein, many variations are possible which remain within the concept, scope, and spirit of the invention, and these variations would become clear to those skilled in the art after perusal of this application.

For example, the principles of the invention could be applied, not only to B-mode imaging, but also to color Doppler imaging, such as color Doppler energy (CDE) or Doppler tissue imaging (DTI). In such alternative embodiments, the imaging values for acoustic data points would comprise velocity values or other values, instead of intensity values. Those skilled in the art would recognize, after perusal of this application, that implementation of the principles of the invention to such alternatives would be workable, is within the scope and spirit of the invention, and would not involve undue experimentation.

In other alternative embodiments using color Doppler imaging, the imaging values may be processed to preferentially amplify information (i.e., apply gain to acoustic samples) about blood pools and blood vessels rather than for reflecting tissue.

I claim:

1. In a method for processing ultrasound signals, the improvement comprising:

receiving a current set and a successive set of acoustic signals, each said acoustic signal in said current set having a range value, a cross-range value, and at least one imaging value;

defining a set of zones, each one zone in said set of zones having at least one range boundary and at least one cross-range boundary;

assigning acoustic signals to zones, said assigning step being responsive to the range and cross-range values of said acoustic signals;

defining a zone intensity value for each zone, each said zone intensity value being responsive to at least one said imaging value from said acoustic signals assigned to said zone;

selecting a plurality of zones;

determining a set of attenuation estimates in response to said zone intensity values for said selected plurality of zones; and altering at least one signal of said current set or said successive set of acoustic signals in response to said attenuation estimates.

2. A method as in claim 1, further comprising the steps of receiving a second successive set of acoustic signals; and altering said second successive set of acoustic signals responsive to said attenuation estimates.

3. A method as in claim 1, further comprising the step of determining a set of attenuation estimates for a set of non-selected zones in response to said attenuation estimates for said selected plurality of zones.

4. A method as in claim 1, wherein said acoustic signals and said zone intensity values are digital.

5. A method as in claim 1, further comprising the step of modifying said set of attenuation estimates, and producing a gain compensation curve in response to said modified set of attenuation estimates before said step of altering at least one of said current set and successive set of acoustic signals.

6. A method as in claim 5, wherein said step of modifying is performed for at least a subset of said set of attenuation estimates.

7. A method as in claim 5, wherein said step of modifying comprises the step of adjusting a subset of said set of attenuation estimates for a selected set of range values or a selected set of cross-range values.

8. A method as in claim 1, further comprising the steps of defining a set of rows of said zones;

defining a polynomial curve as a function of said set of rows, said polynomial curve having selected matching criteria to said set of attenuation estimates for a selected set of ranges;

selecting a point on said polynomial curve; and setting each one attenuation estimate of said set of attenuation estimates in a range from said selected point to an endpoint of said polynomial curve equal to a weighted sum of said one attenuation estimate and a corresponding one attenuation estimate in a second set of attenuation estimates.

9. A method as in claim 8, wherein said point is a maximum point or a minimum point.

10. A method as in claim 1, wherein said acoustic signals comprise Doppler imaging signals.

11. A method as in claim 1, wherein said step of receiving comprises the step of receiving scan converted acoustic signals.

12. A method as in claim 1, further comprising the steps of selecting a first set of zones, each zone in said first set having its said zone intensity value in a first selected range of zone intensity values; and selecting a second set of zones, each zone in said second set being a neighbor of at least one zone in said first set, and each zone in said second set having its said zone intensity value in a second selected range of zone intensity values.

13. A method as in claim 1, comprising time averaging said acoustic signals.

14. A method as in claim 1, wherein each said zone intensity value comprises a weighted sum of said imaging values for said acoustic signals in said zone, said zone comprising said acoustic signals having a depth value within a selected range and having a cross-range value within a selected range.

15. A method as in claim 1, wherein said acoustic signals comprise at least three coordinate dimensions.

16. A method as in claim 1, wherein said selected plurality of zones is less than all of said zones.

17. A method as in claim 1, wherein said step of defining a zone intensity value comprises integrating a set of acoustic signal imaging values along at least a part of an ultrasound scan line.

18. A method as in claim 1, wherein said step of determining a set of attenuation estimates comprises determining a set of rows, each said row having at least a selected minimum number of said selected plurality of zones; and determining a mean of said zone intensity values for said selected plurality of zones in each of said rows.

19. A method as in claim 18, wherein each said row comprises only zones having cross-range values in a selected central region of said cross-range values.

20. A method as in claim 1, wherein said zone intensity values are each responsive to at least one said imaging value in said acoustic signals not within said zone.

21. A method as in claim 1, further comprising the steps of determining a gain compensation curve in response to said set of attenuation estimates; and applying said gain compensation curve to alter said successive set of acoustic signals.

22. A method as in claim 21, wherein said step of determining a gain compensation curve comprises the steps of defining a set of rows, each said row having at least one of said selected plurality of zones;

selecting a set of rows, each selected row having a valid attenuation estimate; and interpolating a set of attenuation estimates for a defined set of rows not in said set of selected rows.

23. A method as in claim 21, comprising the step of displaying said successive set of acoustic signals.

24. A method as in claim 23, comprising receiving a set of operator compensation values in response to an operator control; and applying said set of operator compensation values to said successive set of acoustic signals before said step of displaying.

25. A method as in claim 21, comprising the steps of determining a first gain compensation curve applied to said current set of acoustic signals in response to an earlier set of said first acoustic signals; and removing said first gain compensation curve from application to said current set of acoustic signals before determining said zone intensity values.

26. A method as in claim 25, wherein said first gain compensation curve is responsive to an operator control.

27. A method as in claim 21, comprising determining a first gain compensation curve applied to said current set of acoustic signals in response to an earlier set of said acoustic signals;

determining a second gain compensation curve applied to said current set of acoustic signals in response to an earlier set of said acoustic signals; and determining said zone intensity values after removing said first gain compensation curve but not removing said second gain compensation curve.

28. A method as in claim 21, wherein a first said zone is a region comprising selected acoustic signals having a first selected range of said cross-range values and a second selected range of said range values, said region consisting essentially of between about one millionth and about one fiftieth of an image area for said acoustic signals.

29. A method as in claim 21, wherein said acoustic signals comprise at least three positional dimensions.

30. A method as in claim 21, wherein said imaging value comprises a logarithm of a signal magnitude.

31. A method as in claim 21, wherein said imaging value comprises a square of a signal magnitude.

32. A method as in claim 21, wherein said step of selecting a plurality of zones comprises selecting a set of first zones each having said zone intensity value in a first selected range; and selecting a set of second zones, each a neighbor of at least one said first zone and each having said zone intensity value in a second selected range.

33. A method as in claim 21, wherein said step of selecting a plurality of zones comprises selecting a set of first zones each having said zone intensity value in a first selected range; and selecting a set of second zones, each a neighbor of at least one of a said first zone and a said second zone, and each having said zone intensity value in a second selected range.

34. A method as in claim 21, wherein said selected plurality of zones is less than all of said zones.

35. A method as in claim 21, wherein said selected plurality of zones comprises a set of said zones each having said zone intensity value in a first selected range.

36. A method as in claim 21, wherein said step of defining a zone intensity value comprises averaging a set of imaging values for acoustic signals in said zone.

37. A method as in claim 21, wherein said step of determining a set of attenuation estimates further comprises the steps of determining a set of rows, each said row having a number of said selected plurality of zones exceeding a selected threshold; and determining for each said row, a mean of said zone intensity value for said selected plurality of zones in said row.

38. A method as in claim 21, wherein said step of determining a gain compensation curve further comprises the steps of determining a set of rows, each said row having a set of said plurality of zones;

determining a set of selected rows, each selected row having a valid attenuation estimate; and interpolating a set of attenuation estimates for a set of rows not in said set of selected rows.

39. A method as in claim 21, wherein said step of determining a gain compensation curve further comprises the steps of determining an inverse of a first set of attenuation estimates;

determining an inverse of a second set of attenuation estimates; and determining said gain compensation curve in response to said inverse for said first set and said inverse for said second set.

40. A method as in claim 21, wherein said step of determining a gain compensation curve further comprises the steps of determining an inverse of a first set of attenuation estimates;

determining an inverse of a second set of attenuation estimates;

determining a difference between said inverse for said first set and said inverse for said second set; and determining said gain compensation curve as a weighted sum of said inverse for said first set and said inverse for said second set.

41. A method as in claim 40, wherein a weight for said inverse for said second set is zero when said difference is less than a selected threshold.

42. A method as in claim 21, wherein said step of determining a set of attenuation estimates comprises the step of determining a mean of said zone intensity values for said selected plurality of zones.

43. A method as in claim 21, wherein said subset of acoustic signals comprises less than all said acoustic signals.

44. In an apparatus for processing ultrasound signals, the improvement comprising:

an ultrasound transducer array capable of generating and receiving acoustic signals, each said acoustic signal having a range value, a cross-range value, and an imaging value;

a preprocessor coupled to said acoustic signals, said preprocessor generating a preprocessor signal representative of a set of zone intensity values responsive to said range values, cross-range values, and imaging values;

a processor coupled to said preprocessor signal, said processor generating a gain compensation signal responsive to said zone intensity signals; and an amplifier coupled to said acoustic signals and to said gain compensation signal.

45. Apparatus as in claim 44, wherein said processor comprises means for generating an attenuation signal responsive to said zone intensity values;

means for altering a selected section of said attenuation signal; and means for generating said gain compensation signal responsive to said altered attenuation signal.

46. Apparatus as in claim 44, wherein said processor comprises means for marking selected ones of said zones as valid, responsive to said zone intensity values;

means for defining a row mean value for each row of said zones, responsive to said zone intensity values for said selected valid zones in said row; and means for generating said gain compensation signal responsive to said row mean values.

47. Apparatus as in claim 46, wherein said processor further comprises means for marking selected ones of said rows as valid, responsive to said selected valid zones in said rows;

means for defining a row mean value for a selected valid row, responsive to said zone intensity values in said selected valid row; and means for defining a row mean value for a row not selected as valid, responsive to said row mean values for selected valid rows.

48. Apparatus as in claim 44, wherein said preprocessor comprises means for selecting a set of acoustic signals for a set of zones, responsive to said range values and cross-range values; and means for defining a zone intensity value for each said zone, responsive to imaging values of said acoustic signals for said zone.

49. Apparatus as in claim 44, further comprising:

means for receiving a set of operator compensation values in response to an operator control;

means for incorporating said set of operator compensation values to said preprocessor signal for generation of said gain compensation signal.

50. In an apparatus for processing ultrasound signals, the improvement comprising:

means for receiving a current set and a subsequent set of ultrasound data, each said set of data comprising a set of acoustic signals, each said acoustic signal having a depth value, a cross-range value, and at least one imaging value;

means for assigning said acoustic signals to a plurality of zones in response to said cross-range value and said depth value;

means for designating a zone intensity value for each said zone in response to said at least one imaging value for at least one acoustic signal in each said zone;

means for selecting a plurality of said zones in response to said zone intensity values;

means for determining a set of attenuation estimates in response to said zone intensity values for said selected plurality of zones;

means for determining a gain compensation curve in response to said attenuation estimates; and means for applying said gain compensation curve to said subsequent set of ultrasound data to produce a set of gain compensated data for display or storage.

51. Apparatus as in claim 50, comprising means for receiving a second subsequent set of ultrasound data; and means for applying said gain compensation curve to said second subsequent set of ultrasound data.

52. Apparatus as in claim 50, comprising means for modifying said set of attenuation estimates to produce a modified set of attenuation estimates;

wherein said means for determining a gain compensation curve operates in response to said modified set of attenuation estimates.

53. Apparatus as in claim 52, comprising means for adjusting a subset of said set of attenuation estimates for a selected set of range values or a selected set of cross-range values.

54. Apparatus as in claim 52, wherein said means for modifying comprises means for defining a polynomial curve as a function of a defined set of rows of said zones, said polynomial curve having selected matching criteria to said set of attenuation estimates for a selected set of ranges;

means for selecting a point on said polynomial curve; and means for setting each one attenuation estimate of said set of attenuation estimates in a range from said selected point to an endpoint of said polynomial curve equal to a weighted sum of said one attenuation estimate and a corresponding one attenuation estimate in a second set of attenuation estimates.

55. Apparatus as in claim 54, wherein said selected point is a maximum point or a minimum point.

56. Apparatus as in claim 50, comprising means for determining a first gain compensation curve applied to said ultrasound data in response to an prior set of said ultrasound data;

means for removing said first gain compensation curve from application to said ultrasound data before determining said zone intensity value.

57. Apparatus as in claim 56, comprising means for determining said first gain compensation curve responsive to an operator control.

58. Apparatus as in claim 50, comprising means for displaying said gain compensated ultrasound data.

59. Apparatus as in claim 50, comprising means for receiving a set of operator compensation values in response to an operator control;

means for applying said set of operator compensation values to said data before display.

60. Apparatus as in claim 50, wherein a first said zone is a region comprising a set of acoustic signals having a first selected range of said cross-range values and a second selected range of said range values, said region consisting essentially of between about one millionth and about one fiftieth of an image area for said acoustic signals.

61. Apparatus as in claim 50, wherein said acoustic signals comprise at least a part of an ultrasound scan line.

62. Apparatus as in claim 50, wherein said acoustic signals comprise at least three positional dimensions.

63. Apparatus as in claim 50, wherein said acoustic signals comprise post scan conversion data.

64. Apparatus as in claim 50, wherein said imaging value comprises a logarithm of a signal magnitude.

65. Apparatus as in claim 50, wherein said imaging value comprises a square of a signal magnitude.

66. Apparatus as in claim 50, wherein said selected plurality of zones comprises a set of first zones each having said zone intensity value in a first selected range;

a set of second zones, each a neighbor of at least one said first zone and each having said zone intensity value in a second selected range.

67. Apparatus as in claim 50, wherein said selected plurality of zones comprises a set of first zones each having said zone intensity value in a first selected range;

a set of second zones, each a neighbor of at least one of a said first zone and a said second zone, and each having said zone intensity value in a second selected range.

68. Apparatus as in claim 50, wherein said selected plurality of zones is less than all of said zones.

69. Apparatus as in claim 50, wherein said selected plurality of zones comprises a set of said zones each having said zone intensity value in a first selected range.

70. Apparatus as in claim 50, wherein said means for designating a zone intensity value comprises means for determining a mean intensity for said zone.

71. Apparatus as in claim 50, wherein said means for designating a zone intensity value comprises means for averaging a set of acoustic signals along at least a part of an ultrasound scan line.

72. Apparatus as in claim 50, wherein said means for designating a zone intensity value comprises means for averaging a set of imaging values for acoustic signals in said zone.

73. Apparatus as in claim 50, wherein said means for determining a set of attenuation estimates comprises means for determining a set of rows, each said row having a number of said selected plurality of zones exceeding a selected threshold; and means for determining for each said row, an average of said zone intensity values for said selected plurality of zones in said row.

74. Apparatus as in claim 73, wherein each said row comprises only zones having a selected range of cross-range values.

75. Apparatus as in claim 73, wherein each said row comprises only zones having cross-range values in a selected central region of said cross-range values.

76. Apparatus as in claim 50, wherein said means for determining a gain compensation curve comprises means for determining a set of rows, each said row having a set of said plurality of zones;

means for determining a set of selected rows, each selected row having a valid attenuation estimate; and means for interpolating a set of attenuation estimates for a set of rows not in said set of selected rows.

77. Apparatus as in claim 50, wherein said means for determining a gain compensation curve comprises means for determining an inverse of a first set of attenuation estimates;

means for determining an inverse of a second set of attenuation estimates; and means for determining said gain compensation curve in response to said inverse for said first set and said inverse for said second set.

78. Apparatus as in claim 50, wherein said means for determining a gain compensation curve comprises means for determining an inverse of a first set of attenuation estimates;

means for determining an inverse of a second set of attenuation estimates; and means for determining a difference between said inverse for said first set and said inverse for said second set; and means for determining said gain compensation curve as a weighted sum of said inverse for said first set and said inverse for said second set.

79. Apparatus as in claim 50, wherein said means for determining a global gain value comprises means for determining a mean of said zone intensity values for said selected plurality of zones.

80. Apparatus as in claim 50, wherein said subset of acoustic signals comprises less than all said acoustic signals.

81. In an apparatus for processing ultrasound signals, the improvement comprising:

means for receiving a set of acoustic signals, each said acoustic signal having a cross-range value, a depth value, and an imaging value;

means for digitizing said acoustic signals;

means for determining a first gain compensation curve applied to said acoustic signals in response to a prior set of said acoustic signals, and for removing said first gain compensation curve;

means for defining a set of zone intensity values, each said zone intensity value being responsive to at least one said imaging value in a set of said acoustic signals defining a zone, said zone being responsive to said cross-range value of said digitized acoustic signals;

means for defining a first set of valid zones having said zone intensity values within a selected band, and for defining a second set of zones neighboring said valid zones and having said zone intensity values near those of said valid zones;

means for defining a set of valid rows of zones, each having at least a threshold number of valid zones in a selected region of said row of zones;

means for determining a set of attenuation estimates in response to said zone intensity values for a selected plurality of zones;

means for determining a set of attenuation estimates for a set of non-selected zones in response to said attenuation estimates for said selected plurality of zones;

means for defining a parabola, fitting said set of attenuation estimates for a selected set of range values near an endpoint of said set of attenuation estimates, for selecting a peak point of said fitted curve, and for modifying said set of attenuation estimates from said peak point to said endpoint;

means for altering said acoustic signals in response to said attenuation estimates;

means for scan converting said altered acoustic signals; and means for displaying said scan converted acoustic signals.

82. A gain compensation subsystem in an apparatus for processing ultrasound signals, which apparatus transmits and receives ultrasound signals, the subsystem comprising:

a processor memory in which is resident;

a) a representation of a set of acoustic signals, said acoustic signals each having a cross-range value, a depth value, and an imaging value;

b) a set of zone intensity values for said acoustic signals, said zone intensity values being responsive to said range values, cross-range values, and imaging values; and c) a set of gain request values representative of gain compensating for attenuation of said acoustic signals, said gain request values being generated responsive to said zone intensity values.

83. Apparatus as in claim 81, further comprising:

means for receiving a set of operator compensation values in response to an operator control;

means for applying said set of operator compensation values to said attenuation estimates such that said altered acoustic signals are altered in response to operator input.

84. Apparatus as in claim 82, further comprising:

means for receiving a set of operator compensation values in response to an operator control;

means for applying said set of operator compensation values to said gain request values such that the gain compensating for attenuation is altered in response to operator input.

* * * * *

UNITED STATES PATENT AND TRADEMARK OFFICE
CERTIFICATE OF CORRECTION

PATENT NO. : 5,579,768
DATED : December 3, 1996
INVENTOR(S) : Kevin L. Klesenski It is certified that error appears in the above-indentified patent and that said Letters Patent is hereby corrected as shown below:

In the Title Page

Column 2, line 4, under "OTHER PUBLICATIONS", immediately before "Adaptive" insert --"--.

Column 2, line 4, under "OTHER PUBLICATIONS", immediately after "Imaging," insert --"--.

In the Background of the Invention

Column 2, line 21, please delete " band".

In the Description of the Preferred Embodiments

Column 12, line 40, immediately after "and" please insert --computes--.

Signed and Sealed this

Thirty-first Day of March, 1998

Attest:

BRUCE LEHMAN

*Attesting Officer*   *Commissioner of Patents and Trademarks*